United States Patent
Kimura et al.

(10) Patent No.: US 7,516,292 B2
(45) Date of Patent: Apr. 7, 2009

(54) METHOD FOR PREDICTING AND AVOIDING DANGER IN EXECUTION ENVIRONMENT

(75) Inventors: Yukihiro Kimura, Shizuoka (JP); Masakazu Hayashi, Kawasaki (JP); Katsutomo Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 303 days.

(21) Appl. No.: 11/170,217

(22) Filed: Jun. 29, 2005

(65) Prior Publication Data

US 2005/0240641 A1 Oct. 27, 2005

Related U.S. Application Data

(63) Continuation of application No. PCT/JP03/05814, filed on May 9, 2003.

(51) Int. Cl.
*G06F 12/00* (2006.01)
(52) U.S. Cl. .................... 711/170; 711/156; 707/206
(58) Field of Classification Search ............... 707/206; 711/170
See application file for complete search history.

(56) References Cited

U.S. PATENT DOCUMENTS 6,542,911 B2 * 4/2003 Chakraborty et al. ....... 707/206

FOREIGN PATENT DOCUMENTS

| JP | 5-27993 | 2/1993 |
|---|---|---|
| JP | 11-212808 | 8/1999 |
| JP | 11-312117 | 11/1999 |
| JP | 11-312117 A | 11/1999 |
| JP | 2001-265650 | 9/2001 |
| JP | 2001-265650 A | 9/2001 |

OTHER PUBLICATIONS

Yoshikawa et al.; A generational GC Scheme that Dynamically Adjusts New Generation Heap Sizes Based on an efficiency Model; vol. 41, No. SIG 9 (PRO8); Nov. 2000; pp. 78-87.
"A Generational GS Scheme that Dynamically Adjusts New Generation Heap Sizes Based on an Efficiency Model", Takahide Yoshikawa and Takashi Chikayama, Journal of Information Processing Society of Japan, Information Processing Society of Japan, vol. 41, No. SIG9 (PRO8), p. 78-86.

* cited by examiner

*Primary Examiner*—Hetul Patel
(74) *Attorney, Agent, or Firm*—Green, Burns & Crain, Ltd.

(57) ABSTRACT

Measurement/analysis unit in a Java virtual machine has the function of measuring data when an event of garbage collection occurs, and the function of periodically measuring data. The measurement/analysis unit analyzes the measured data and predicts a danger of a memory shortage, and predicts a danger using an algorithm depending on the type of garbage collection used by the Java virtual machine. An application server is notified of a warning of the predicted danger of a memory shortage by an analysis result notification means by an inter-process communication, or the like. The measurement/analysis unit calculates a memory capacity required to avoid the predicted danger of a memory shortage, and the calculated memory capacity is transmitted to the application server by the analysis result notification means by an inter-process communication, or the like in the same way as the warning.

8 Claims, 23 Drawing Sheets

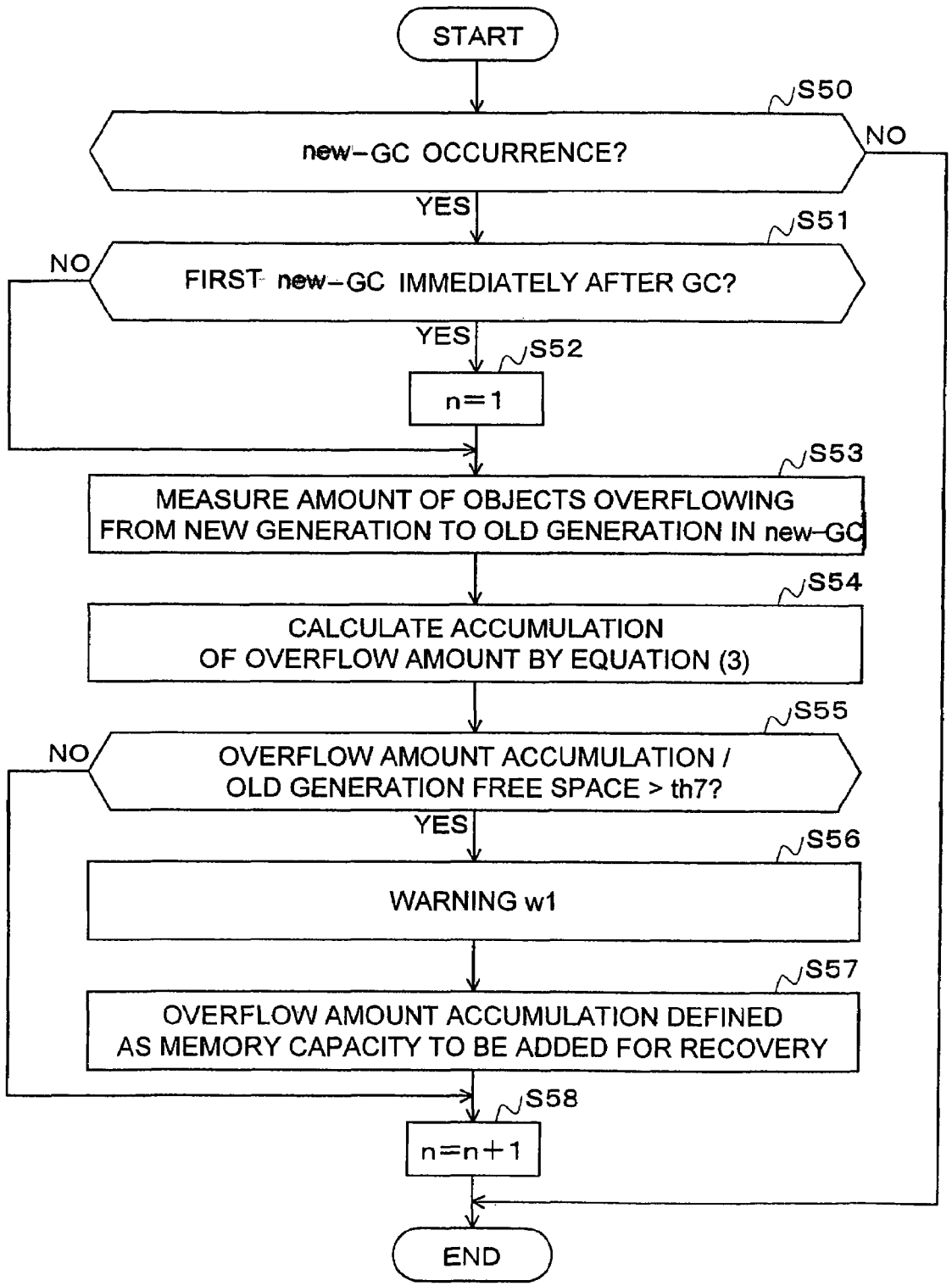

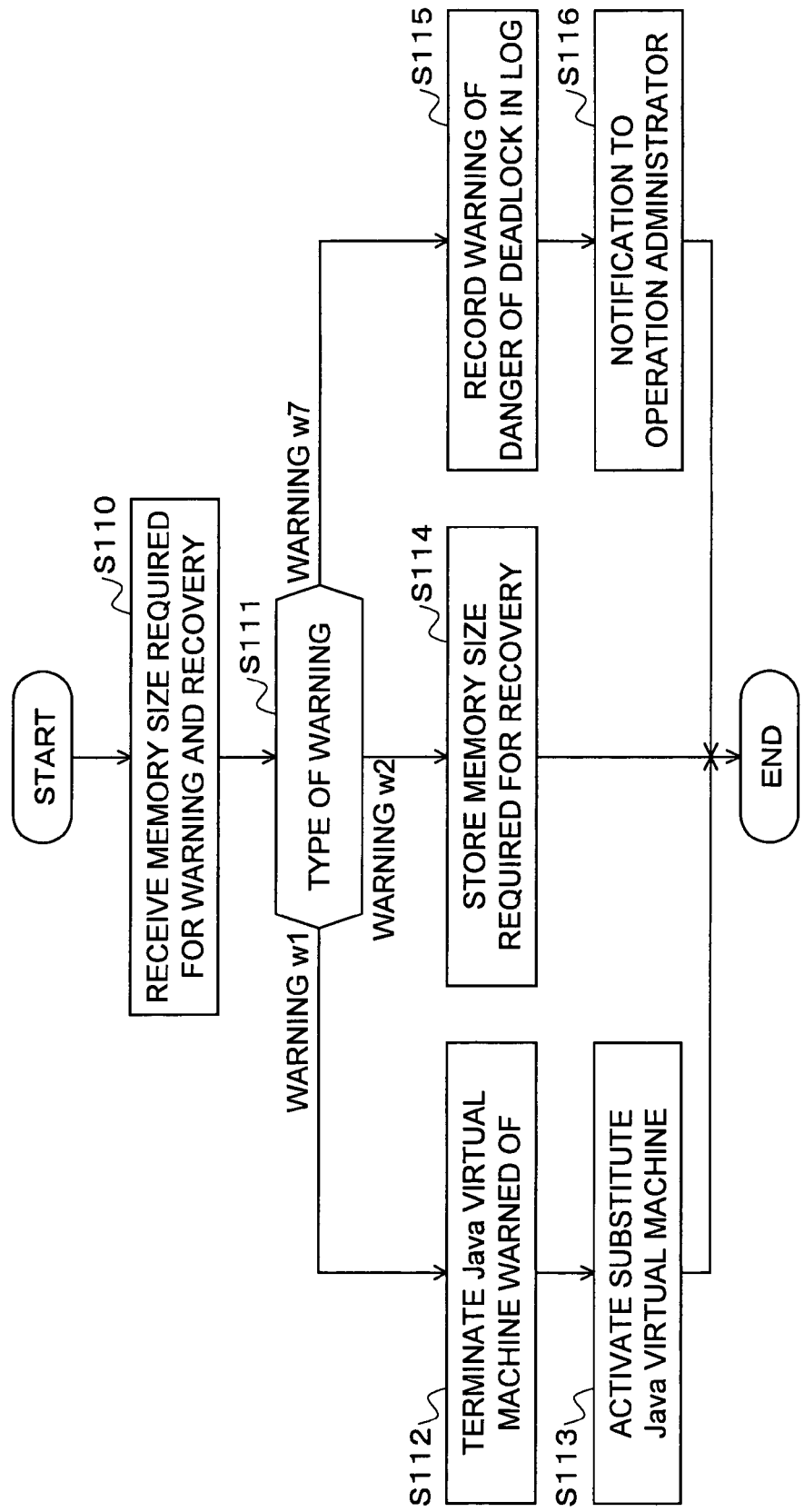

METHOD FOR PREDICTING AND AVOIDING DANGER IN EXECUTION ENVIRONMENT

CROSS REFERENCE TO RELATED APPLICATIONS

This is a continuation application of PCT application No.PCT/JP03/05814 filed on May 9, 2003 in Japan.

BACKGROUND OF THE INVENTION

1. Field of the Invention

This invention relates to a method for predicting and avoiding danger in execution environment to stably operate an application program, and more specifically to the method for predicting and avoiding danger in execution environment by monitoring a status of the execution environment of an intermediate layer arranged on a server during an operation of the application and avoiding a dangerous state of the execution environment in a 3-layer system comprising a client layer, an intermediate layer, and a database layer, which make an enterprise application, thereby successfully operating the application with stability.

2. Description of the Related Art

The above mentioned enterprise application may be a Web application that mainly uses Java (registered trademark). The structure of the above mentioned enterprise application may also be a 4-layer system in which the intermediate layer are further divided into 2-layer. An execution environment of the intermediate layer arranged on the server may be a Java virtual machine, etc. The present invention is applied an execution system such as Java which has a memory management function such as garbage collection.

Java is used as an example for explanation below. FIG. 1 shows an example of an operation environment of a Java application. In the example shown in FIG. 1, data is collected which are in operating an application in an execution environment 1000 of a Java application, and the collected data is analyzed by a performance analysis tool 2000. By feeding back an analysis result from the performance analysis tool 2000 to the execution environment 1000 of a Java application, the most suitable operation environment of the optimum Java application can be structured.

In the execution environment 1000 of a Java application, a Java virtual machine 1020 is arranged in an upper layer of an OS 1010, and an application server 1030 is arranged in an upper layer of the Java virtual machine 1020. An example of the application server 1030 may be an EJB container and a Servlet container, which are programs for operating an EJB (enterprise JavaBeans) and a Servlet, respectively. In the upper layer of the application server 1030, an application 1040 such as the Servlet, a JSP (Java server pages), and the EJB, etc. operates. A Web server 1050 accepts a request from a client. What best understands the operation status of the Java application is the Java virtual machine 1020 which is arranged in the bottom layer of the execution environment 1000 and actually executes an application.

In the performance analysis tool 2000, the data collected from the execution environment 1000 is accumulated in a performance database 2010, and the accumulated data is analyzed by an analysis program 2020. An analysis result is displayed on a monitoring tool 2030 and more precisely analyzed by a drill down tool 2040. Additionally, a service level diagnosis (tool) 2050 makes a diagnosis such as whether or not the server determines replies to the request from a client within a predetermined time, or whether or not the status of the current service has been satisfied.

FIG. 2 shows an example of a method for analyzing an operation environment of the conventional Java application. In FIG. 2, the data collected from a server 3000 for operating a Java application (a server having the execution environment 1000 of a Java application) is accumulated in a data accumulation device 3010 which has the performance database 2010. A performance analysis device 3020 refers to the data accumulated in the data accumulation device 3010, and analyzes the data using the analysis program 2020. An operation administrating person 3030 uses the performance analysis device 3020 to display an analysis result with a graph by using the monitoring tool 2030, to perform a detailed analysis by using the drill down tool 2040, and to diagnose a service level by using the service level diagnosis 2050.

The conventional technologies relating to the safe operation of an enterprise application are listed below.

(First Conventional Technology)

There is a technology in which an operation administrating person monitors a service throughput and a system performance on the server by a monitoring tool. This technology analyzes measured data, predicts and detects a sign of trouble by using a threshold, and notifies the operation administrating person of the sign. Further, this technology analyzes the measured data by using an analyzing tool, and then, based on the analysis, makes a graph of the operation status and evaluated it, and analyzes performance data in detail (drill down), thereby this technology supports to specify a bottleneck of a lowering of performance etc. The example in FIG. 2 is an example of the first conventional technology.

The throughput of the service may be how many second is needed to response to the request from the client. The system performance on the server may be the CPU use rate, the memory use amount, the network use rate, etc.

The documents listed below describes the first conventional technology:

Non-patent Document 1; Systemwalker, Performance Management Product, Fujitsu Limited (URL (old): http://systemwalker.fujitsu.com/jp/com/conc/pafo.html or URL (new): http://systemwalker.fujitsu.com/jp/perfmgr/), Non-patent Document 2; System Management/Tivoli, Performance & Availability Product, Japan IBM, (URL: http://www-6.ibm.com/jp/software/tivoli/products/index.html#per), and Non-patent Document 3; Precise/Indepth for J2EE, Nikki Information Software (URL (old): http://www/jsys-products.com/product/pre_ind_j2ee/document. html or URL (new): http://www.cosmos.jp/data/indepth_j2ee.pdf).

(Second Conventional Technology)

There is a technology in which the processing time of services such as Servlet, EJB, etc. is measured in the environment in which servers have different levels of throughput, and a high-speed processing server is automatically selected and allotted to a request from a client, thereby efficiently performing the process of the entire system.

The document listed below describes the second conventional technology:

Non-patent Document 4; IBM eServer, Work Load Management Among Different Models, Japan IBM (URL: http://www-6.ibm.com/jp/servers/eserver/ac/tech/index2_1.html)

(Third Conventional Technology)

There is a technology in which, using the API (application program interface) for checking the memory capacity of Java, the size of the memory (heap) managed by the Java virtual machine is periodically checked to detect memory shortage. In this technology, when free space of memory is smaller than a threshold, garbage collection is forced, thereby supporting the recovery of the free space of memory.

The document listed below describes the third conventional technology:

Non-patent Document 5; WebLogic Server, Tuning of Java Virtual Machine, Automatic Detection of Low Memory Status and Forcing Garbage Collection, Japan BEA Systems (URL (old) : http://edocs,beasys.co.jp/e-docs/wls/docs70/perform/JVMTuning.html.#489159 or URL (new): http://edocs.beasys.co.jp/e-docs/wls/docs70/perform/JVMTuning.html).

(Fourth Conventional Technology)

There is a technology in which an event generated in a Java virtual machine is measured by Java virtual machine profiler interface, and then, based on the result, a detection is performed to detect a method taking a long execution time (bottleneck), to detect an object having a danger of a memory leak, and to detect a thread having a danger of a deadlock.

An event measured by a Java virtual machine profiler interface may be "Garbage collection has been started/terminated", "Java method has been started/terminated", "An object has been assigned/released", and "The status of a Java thread has changed", etc.

However, the conventional technology relating to the stable operation of the above mentioned enterprise application has the following problems (Problems with the First Conventional Technology)

In the first conventional technology, a monitoring tool is used for collecting various data and graphing the data, but requires the interference of an operating person in predicting and avoiding trouble. Therefore, it lacks timeliness and autonomy. Especially, the analysis method using the drill down tool thoroughly lacks timeliness. Furthermore, in many cases, although data collection, service level diagnosis (analysis), and notification of a warning may be automatically performed, countermeasures to be taken after receiving a notification have not been automatically realized. Additionally, conditions for the amount of data to be collected and about when data is to be analyzed, etc. have affected the danger detection timing.

(Problems with the Second Conventional Technology)

In the second conventional technology, processes are automatically performed. However, it is only a system of the load balance of distributing a load by measuring the service time, so that it is not a technology of analyzing various collected data to find the factor of a danger.

(Problems with the Third Conventional Technology)

In the third conventional technology, although processes are automatically performed, there have been problems with the algorithm for predicting a trouble. A memory (heap) shortage of a Java virtual machine is a main factor of the trouble. However, correct judgment cannot necessarily be made only by detecting an insufficient heap by comparing available capacity with a threshold.

When a heap becomes short, a Java virtual machine automatically performs garbage collection to recover memory. However, the third conventional technology is designed to recover memory in the preceding stage using forcible garbage collection. The technology may be effective in a case that a memory use amount gradually increases after the memory use amount exceeds a threshold, and it takes relatively a long time until garbage collection is automatically performed.

However, the situation depends on each case. For example, when an absolute amount of memory becomes short and the frequency of the garbage collection is high, the garbage collection continuously occurs although the garbage collection is forcibly performed. As a result, the garbage collection is repeatedly performed, load of which is high.

(Problems with the Fourth Conventional Technology)

In the fourth conventional technology, the frequency of issuing an event provided by Java virtual machine profiler interface is very high, so that an excess load is occurred to a Java virtual machine. Furthermore, since a predetermined interface is used, the information required to detect a danger lacks, or the flexibility of a desired process is limited. A number of tools, which detect a sequence call (bottleneck) having a high CPU use rate or a memory leak, use a profiler interface. However, the tools are subject to a relatively high load, and are to be used not in the application operation but at a test stage.

To solve the above mentioned problems of the conventional technology, to stably operate an application, and to realize a mission-critical system, it is necessary to detect and avoid a danger of trouble before an abnormal condition occurs. Accordingly, it is required that the following conditions should be filled in the period from the detection of the danger to the avoidance thereof.

(1) A load of collecting data for prediction of trouble is to be reduced and no load is allowed for the operation of an application.
(2) Appropriate determination material and algorithm are used to predict trouble for realizing correct prediction.
(3) The process of measuring data, predicting, notifying, and avoiding trouble is to be performed timely and in a short time. Furthermore, it is desired to automatically (autonomically) perform these steps.

SUMMARY OF THE INVENTION

The present invention has been developed to solve the above mentioned problems, and it is an object of the present invention to provide a method of reducing the load of collecting data, more correctly predicting a danger from an appropriate determination material and algorithm, performing a process of measuring data, predicting, notifying, and avoiding trouble timely and in a short time, and automatically performing the these processes.

The present invention is a method for predicting and avoiding (or predicting/avoiding) a danger in an execution environment so that, for example, in an operation environment of an intermediate layer of an enterprise application, a danger of memory shortage can be predicted and avoided. The danger predicting/avoiding method measures data relating to a memory status when an event of garbage collection occurs, predicts a danger of a memory shortage from the measured data, and notifies another application of a warning against the predicted danger of the memory shortage. Furthermore, the method calculates a memory capacity required to avoid the predicted danger of the memory shortage, and notifies of the calculated memory capacity. A danger of the memory shortage is predicted using an algorithm corresponding to each type of the garbage collection.

Practically, for example, when a Java virtual machine is used as an example of an execution environment of an intermediate layer of an enterprise application, data such as occurrence time of an event of garbage collection, a memory use amount, etc. is measured when the event of the garbage collection occurs. For other data, a memory use amount, etc. is periodically measured. Based on the measured data, the danger of the memory shortage error (so called "out of memory" or OutOfMemory), performance reduction due to the memory shortage, etc. are predicted, and the warning of them is notified. Furthermore, the memory capacity required to avoid the danger is calculated. To predict the danger of the memory shortage, not only the prediction based on basic garbage collection is performed, but also the prediction based on specific garbage collection such as generation type garbage collection, etc. is performed.

According to the method for predicting/avoiding the danger in an execution environment of the present invention, when an event other than the garbage collection occurs (for example, when an event of assigning memory occurs, etc.), a memory use amount, etc. is not measured. In other words, the method of the present invention uses mainly the measurement when an event of the garbage collection occurs and the periodical measurement in a relatively long period as necessary, to measure the memory use amount, etc. Therefore, data can be measured without a load on the operation of an application. According to the method for predicting/avoiding the danger in an execution environment of the present invention, the memory capacity required to avoid a predicted danger of the memory shortage is calculated, and the calculated memory capacity is given as a notification. Therefore, the status of the execution environment of an application can be quickly and easily recovered. Furthermore, according to the method for predicting/avoiding the danger in an execution environment of the present invention, a danger is determined by an algorithm corresponding to each type of the garbage collection. Therefore, a more correct danger determination can be performed.

The above mentioned method for predicting/avoiding the danger in an execution environment of the present invention can be realized by a computer and a software program, and the program can be stored in a computer-readable record medium, or provided through a network. The program is installed in a medium such as a hard disk, etc., then loaded in a main storage device, and is executed by a CPU. A record medium can be a portable record medium such as CD-ROM, DVD, etc.

BRIEF DESCRIPTION OF THE DRAWINGS

FIGS. 11 to 15 are flowcharts of a memory use amount measuring and analyzing process.

FIG. 23 is a flowchart of a Java virtual machine optimum control process.

DETAILED DESCRIPTION OF THE PREFERRED EMBODIMENTS

Figure 1:
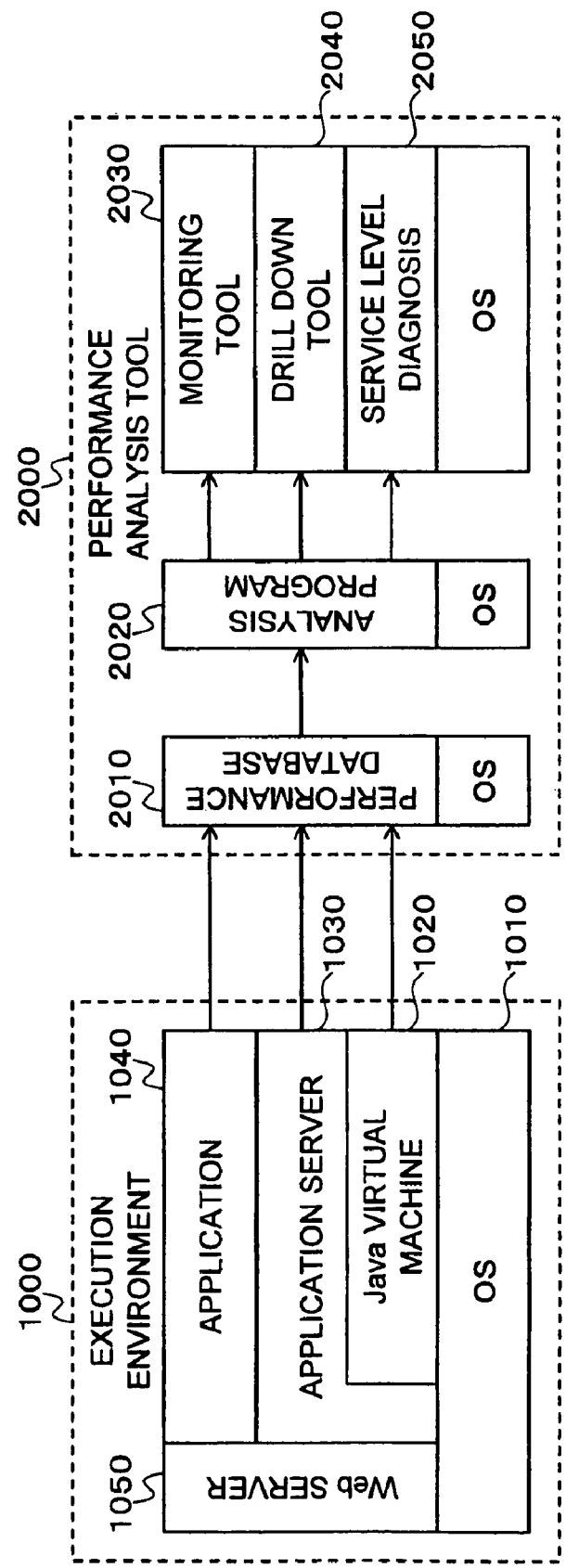
FIG. 1 shows an example of an operation environment of a Java application.
Figure 2:
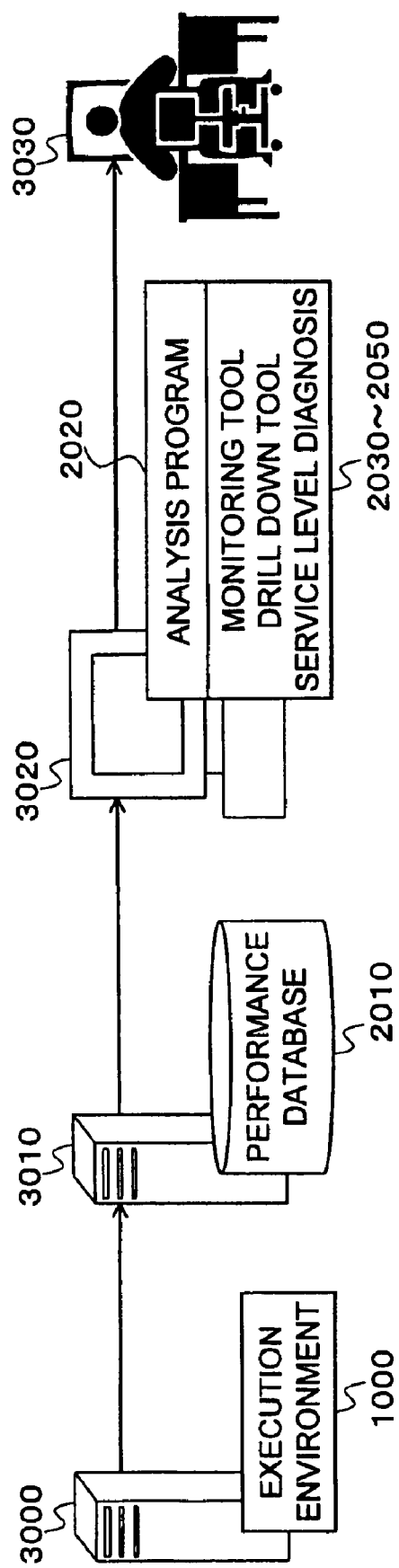
FIG. 2 shows an example of a method of analyzing an operation environment of a conventional Java application.
Figure 3:
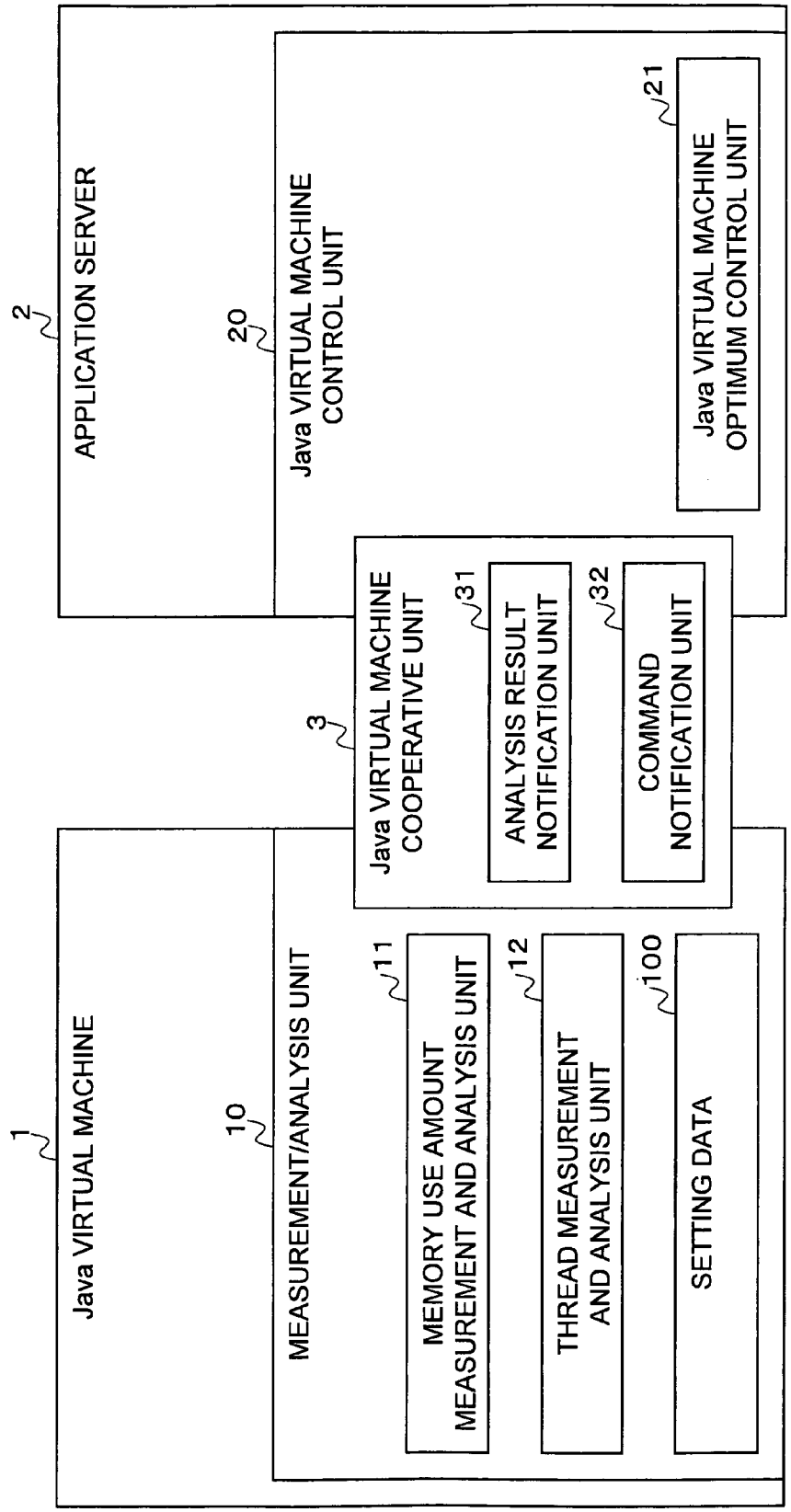
FIG. 3 shows an example of a structure of a danger predicting/avoiding system.

FIG. 3 shows an example of a structure of a danger predicting/avoiding system. In FIG. 3, a Java virtual machine 1 and an application server 2 in the upper layer cooperates through a Java virtual machine cooperative unit 3.

The Java virtual machine 1 has a measurement/analysis unit 10. The measurement/analysis unit 10 comprises a memory use amount measurement and analysis unit 11, a thread measurement and analysis unit 12, and setting data 100.

The application server 2 has a Java virtual machine control unit 20. The Java virtual machine control unit 20 has a Java virtual machine optimum control unit 21.

The Java virtual machine cooperative unit 3 comprises analysis result notification unit 3 1 and command notification unit 3 2.

Figure 4:
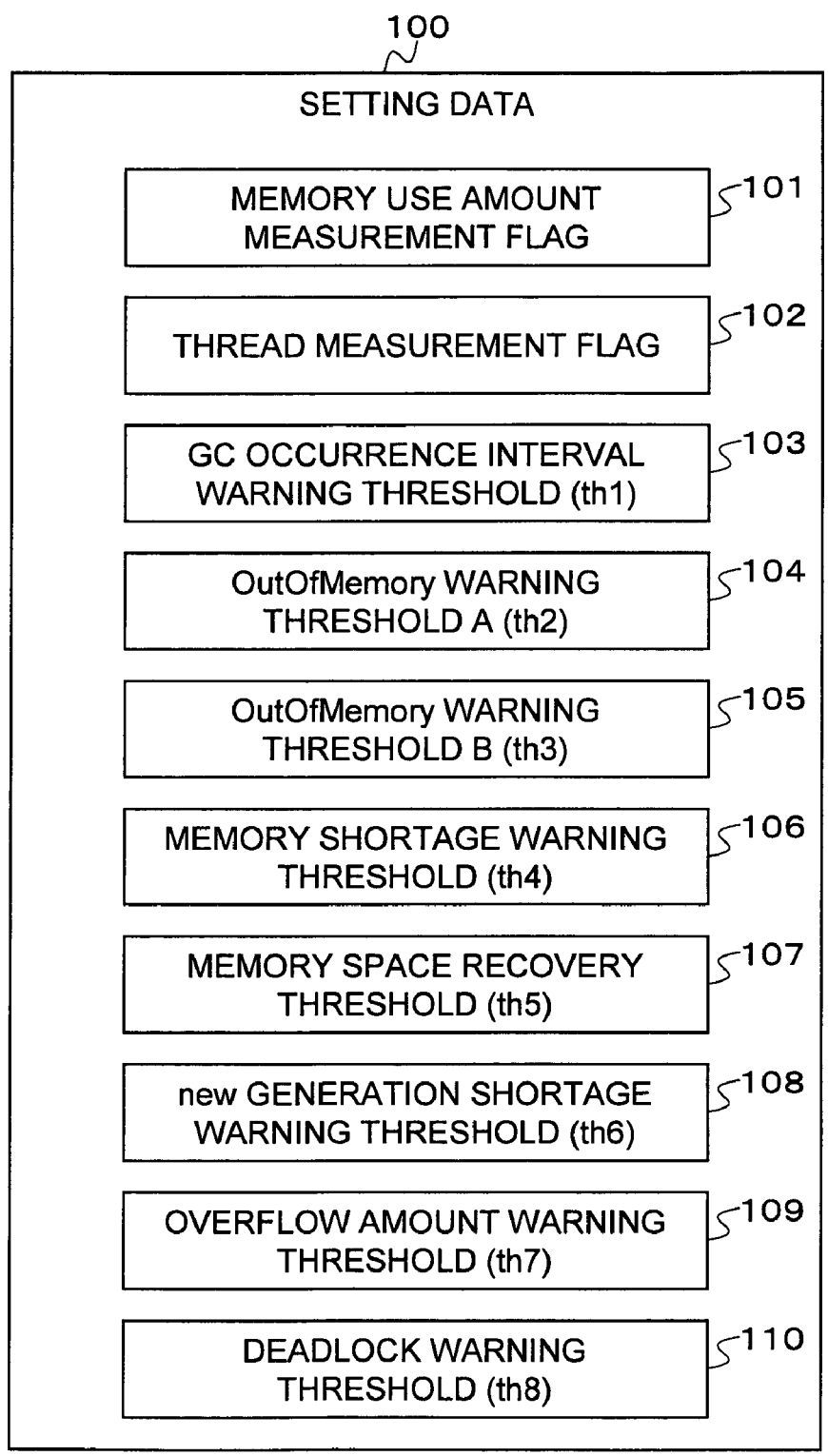
FIG. 4 shows an example of setting data.

FIG. 4 shows an example of setting data. As shown in FIG. 4, the setting data 100 of the measurement/analysis unit 10 is the data of a memory use amount measurement flag 101, a thread measurement flag 102, a GC occurrence interval warning threshold (th1) 103, a first memory shortage error warning threshold (th2) 104, a second memory shortage error warning threshold (th3) 105, the memory shortage warning threshold (th4) 106, a memory space recovery threshold (th5) 107, a new generation shortage warning threshold (th6) 108, an overflow amount warning threshold (th7) 109, and a deadlock warning threshold (th8) 110. The GC is a stand for the garbage collection. Hereinafter, the garbage collection can be represented by GC.

The above mentioned values in the setting data 100 can be set by the application server 2 issuing a command. They also can be set by a system administrating person, etc. in advance or at any time using a setting program not shown in the attached drawings.

The operations of each unit are explained below. First, units of measuring and analyzing data, and predicting a danger in the Java virtual machine 1 are explained, and then explained is a unit of notifying the application server 2 of an analysis result for feedback so that the optimum operation environment can be obtained.

In the present invention, the Java virtual machine 1 has the built-in measurement/analysis unit 10, as shown in FIG. 3. Measuring and analyzing data, and predicting an occurrence of trouble are performed in the Java virtual machine 1. Therefore, the present invention can timely measure and analyze data and predict trouble as compared with the first conventional technology determined by an analytic program by once outputting measured data to a database, etc.

Figure 5:
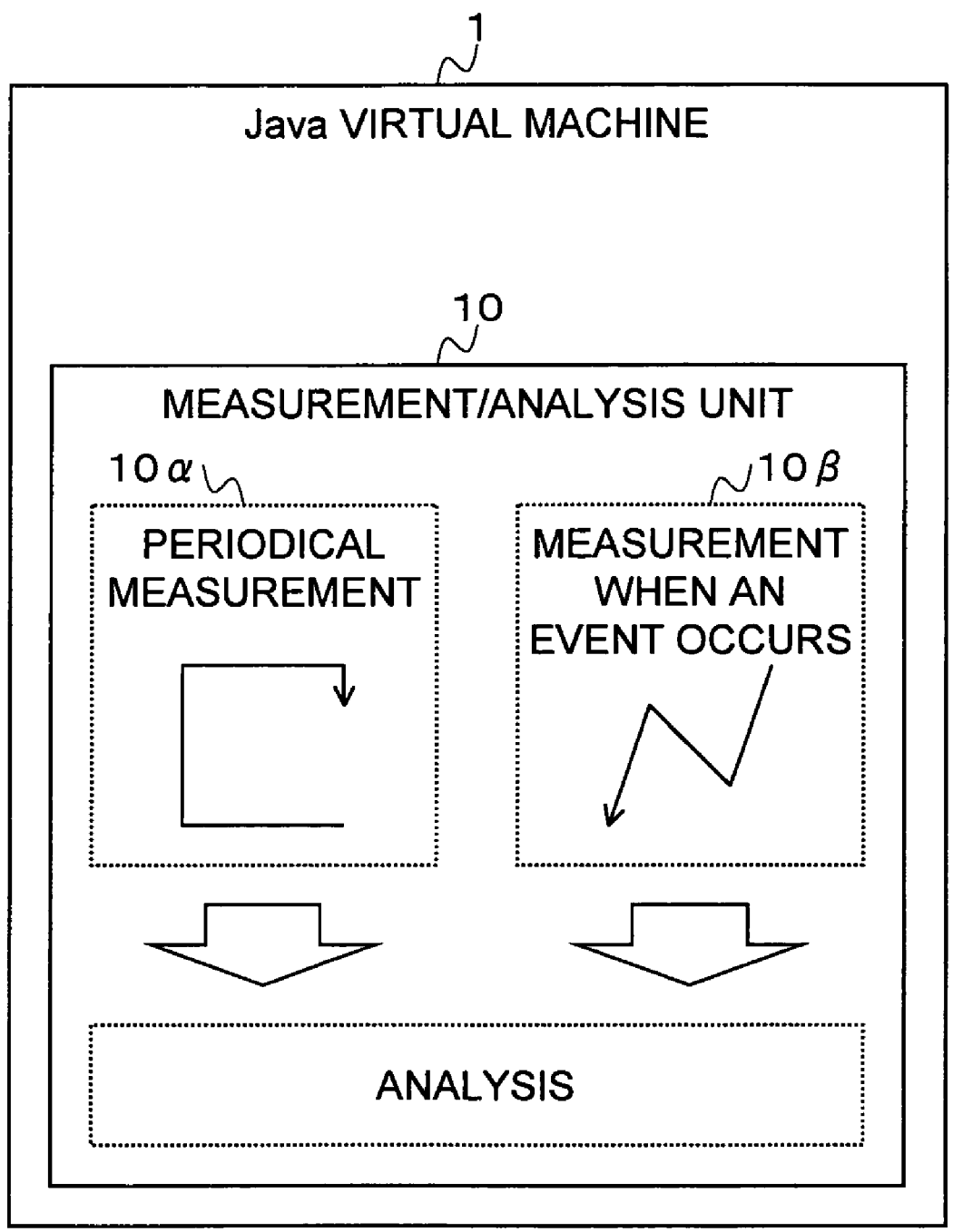
FIG. 5 is an explanatory view of measurement/analysis unit.

FIG. 5 is an explanatory view of measurement/analysis unit. The measurement/analysis unit 10 of the Java virtual machine 1 has two data measuring functions of a function 10α for periodically (for example, at intervals of several seconds) measuring data, and a function 10β for measuring data when an event of the garbage collection occurs.

The correct amount of memory (heap) used by the Java virtual machine 1 is measured when an event of "assignment and releasing memory" occurs. However, the frequency of occurrences of an event is very high, and a heavy load is applied to the operation of an application when data is measured each time an event occurs. The analysis of a memory use amount and the prediction of the danger can be performed by the data to be periodically obtained, and it is not necessary to measure data when an event of "assignment and releasing memory" occurs.

The measurement/analysis unit 10 selects a data measuring function to be used from two data measuring functions (10α, 10β) depending on the items to be measured so that correct data can be measured without a load on the operation of the application.

As shown in FIG. 3, the measurement/analysis unit 10 in the Java virtual machine 1 comprises the memory use amount measurement and analysis unit 11 for measuring and analyzing a memory use amount and the thread measurement and analysis unit 12 for measuring and analyzing a Java thread.

The memory use amount measurement and analysis unit 11 is explained first. The memory use amount measurement and analysis unit 11 periodically measures a memory (heap) use amount and measures the memory use when the garbage collection occurs, and analyzes the data obtained by the measurement, in the Java virtual machine 1. When the memory capacity is short and there is the danger of an occurrence of a memory shortage error, or when the memory shortage badly affects the performance as a result of the analysis, a corresponding warning is issued. A memory size is estimated which are required for the recovery from the status of this time.

The memory use amount measurement and analysis unit 11 measures the memory capacity being used by the Java virtual machine 1 at periodical intervals. The measurement intervals at this time can be set and changed by an option when the Java virtual machine 1 is activated or a command from the Java virtual machine control unit 20 (described later in detail) in the application server 2. The memory use amount measurement and analysis unit 11 measures data when an event of the garbage collection occurs.

Since the Java virtual machine 1 knows well the operation status of itself, it possibly detects the danger of trouble in itself. The most serious trouble in the Java virtual machine 1 is a memory (heap) shortage. Due to the memory shortage, the performance of a machine is reduced, and in the worst case, the process is stopped.

There is a case that requested amount of transactions from a client may be unexpectedly larger, and a case that the memory use amount may exceed an originally estimated amount. The amount requested by a client changes with time, and the memory use amount can change with situation. In this case, the danger of the memory shortage cannot be correctly determined only by simply comparing a measured memory use amount with a threshold as in the above mentioned third conventional technology. Therefore, it is necessary to more appropriately determine the danger depending on the situation.

In a Java application, when memory is required, the memory can be obtained by a new operator. However, in the Java application, the release of memory cannot be written to a program, but is left to the Java virtual machine 1. The memory releasing process in the Java virtual machine 1, that is, the garbage collection, largely affects the performance of a machine. Therefore, the garbage collection in various systems depending on the situation is studied, and the system of the garbage collection depends on each Java virtual machine 1.

Therefore, the method of determining the danger of the memory shortage requires a determining method specific to the garbage collection adopted for each Java virtual machine 1, in addition to the common determining method applicable to any garbage collection.

The memory use amount measurement and analysis unit 11 analyzes the measured data, and determines a possible danger of a memory shortage applicable to all the garbage collection and the danger of the memory shortage specific to adopted each garbage collection for each Java virtual machine 1. It also warns of the dangerous status, and calculates the memory capacity required for the recovery of the status.

An explanation will be made on the basic analysis of data, the warning of the dangerous status and the calculation of the memory capacity required for the recovery of the status by the memory use amount measurement and analysis unit 11. First, the three typical statuses of the occurrence intervals of the garbage collection and the memory use amount are explained below by referring to the attached drawings.

Figure 6A:
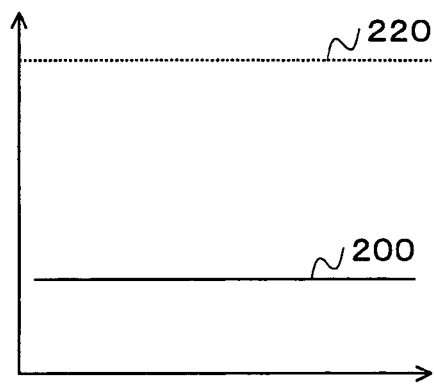
FIG. 6A to 6C show three typical statuses relating to an occurrence intervals of garbage collection and a memory use amount.
Figure 6B:
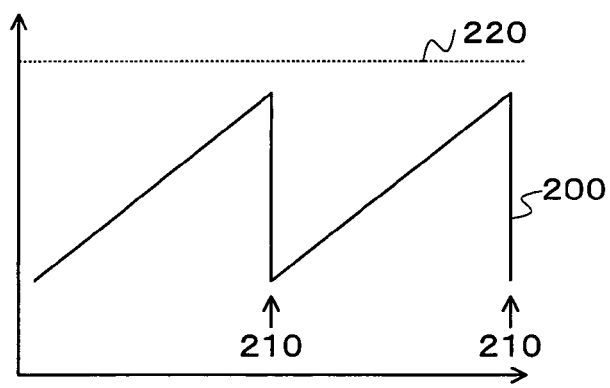
Figure 6C:
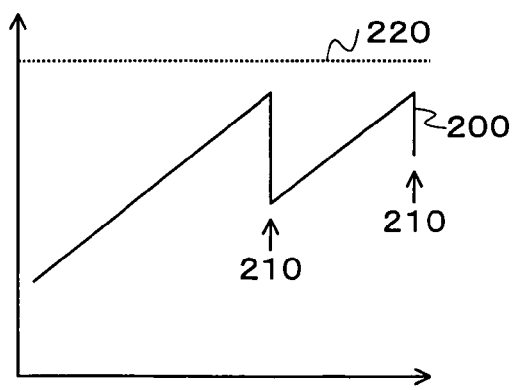

FIG. 6 shows the three typical statuses relating to the occurrence intervals of the garbage collection and a memory use amount. The graphs in FIGS. 6A to 6C show the change of a memory use amount 200 and the occurrence of the garbage collection 210, and show the three typical statuses relating to the occurrence intervals of the garbage collection 210 and the memory use amount 200.

The graphs shown in FIGS. 6A to 6C indicate the memory capacity by a vertical axis and time by a horizontal axis. In the graphs shown in FIGS. 6A to 6C, the solid lines indicate a change with time of the memory use amount 200, and the dotted lines indicate a set maximum heap size 220. The Java virtual machine 1 performs the garbage collection 210, and releases the memory when an event of "memory allocation" makes the memory use amount 200 nearly exceed the maximum heap size 220.

FIG. 6A shows a stable status in which no garbage collection 210 occurs, or a status in which the occurrence intervals of the garbage collection 210 are relatively long and the garbage collection 210 recovers the free space of memory. FIG. 6B shows the status in which the occurrence intervals of the garbage collection 210 tend to become shorter but the garbage collection 210 recovers the free space of memory. FIG. 6C shows the status in which the occurrence interval of the garbage collection 210 is short and the garbage collection 210 does not sufficiently recover the free space of memory. The statuses of FIGS. 6B and 6C are the targets of a warning.

FIG. 7 is an explanatory view showing the status to be warned of.

Figure 7A:
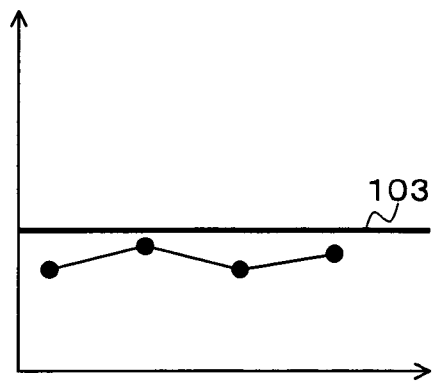
FIG. 7A to 7C are an explanatory view showing a status in which a warning is to be issued.

FIG. 7A shows the status to be warned of performance reduction due to memory shortage. In FIG. 7A, the vertical axis indicates the occurrence intervals of the garbage collection, and the horizontal axis indicates the occurrence of the garbage collection in order at equal intervals. In this example, the occurrence intervals of the garbage collection are shorter than the GC occurrence interval warning threshold 103.

Figure 7B:
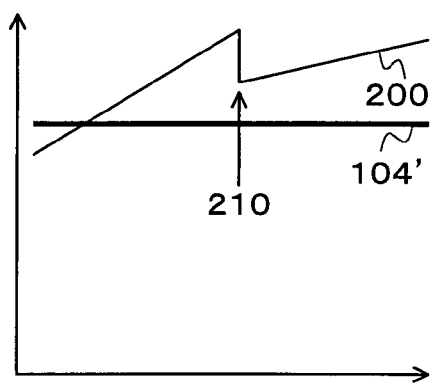
Figure 7C:
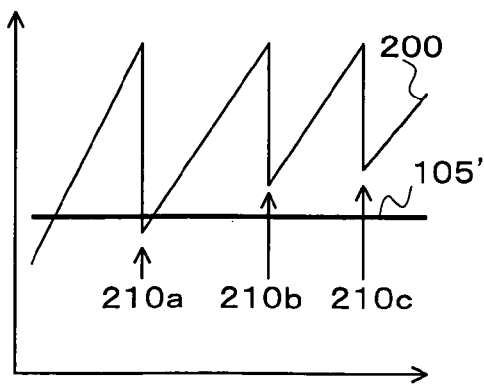

FIGS. 7B and 7C show the status in which a warning of the danger of a memory shortage error is to be issued. In FIGS. 7B and 7C, the vertical axis indicates a memory capacity, and the horizontal axis indicates time. In FIG. 7B, a bold line 104' indicates a value obtained by (total memory capacity)×(the first memory shortage error warning threshold 104). In FIG. 7C, a bold line 105' indicates a value obtained by (total memory capacity)×(the second memory shortage error warning threshold 105).

In FIG. 7B, the change in the memory use amount 200 shows almost no recovery of free space in the memory due to the GC 210. Since the memory use amount 200 after the GC 210 exceeds the bold line 104', it is apparent that the memory use rate, or a value of (memory use amount)/(total memory capacity), exceeds the first memory shortage error warning threshold 104.

In FIG. 7C, the change in the memory use amount 200 shows that the free space of the memory gradually fails to recover in the order of GC 210a, 210b, and 210c. The memory use amount 200 after the GC 210b and the GC 210c exceeds the bold line 105'. Therefore, the use rate of the memory after the GC 210b and the GC 210c exceeds the second memory shortage error warning threshold 105.

It is assumed that the first memory shortage error warning threshold 104 is larger than the second memory shortage error warning threshold 105. Although the use rate of the memory is smaller than the first memory shortage error warning threshold 104, it is determined that there is the danger of the memory shortage error when the use rate of the memory exceeds the second memory shortage error warning threshold 105 and tends to increase.

The following determinations 1 to 3 indicate a determination logic of the danger of the memory shortage of the basic garbage collection by the memory use amount measurement and analysis unit 11. In the following determination of the basic garbage collection, a use rate refers to a ratio of a memory use amount to the total memory capacity. Therefore, the following equation (1) is established.

$$\text{use rate} = (\text{memory use amount})/(\text{total memory capacity}) \quad \text{Equation (1)}$$

(determination 1) When the occurrence intervals of the garbage collection is measured and the occurrence intervals are running below the GC occurrence interval warning threshold 103, it is determined that the memory shortage reduces the performance (FIG. 7A).

(determination 2) When the memory use amount after the garbage collection is measured and the use rate exceeds the first memory shortage error warning threshold 104, it is determined that there is a danger of a memory shortage error (FIG. 7B).

(determination 3) When the memory use amount after the garbage collection is measured and the use rate continuously intends to increase and the use rates exceed the second memory shortage error warning threshold 105, then it is determined that there is a danger of a memory shortage error (FIG. 7C).

The memory use amount measurement and analysis unit 11 warns of the danger of the memory shortage error, the reduction of the performance due to the memory shortage, etc. based on a determination result of the danger of a basic garbage collection as shown by (determination 1) to (determination 3).

The memory use amount measurement and analysis unit 11 also calculates necessary memory capacity for the recovery of a status. For example, the necessary memory size for the recovery in (determination 1) to (determination 3) is calculated such that the free space rate (free space rate=1−use rate) of the memory after the garbage collection can exceed the memory space recovery threshold 107. The calculation is performed to obtain the value of m (capacity to be added for recovery) which satisfies the following equation (2).

$$(\text{free space}+m)/(\text{total memory capacity}+m) > \text{memory space recovery threshold } 107 \quad \text{Equation (2)}$$

Described above are the basic analysis of data, the warning of the dangerous state, and the calculation of the necessary memory capacity for the recovery of a status by the memory use amount measurement and analysis unit 11. Furthermore, by adding and improving the determination depending on the characteristic of each garbage collection, data can be more correctly analyzed, a warning of the dangerous status can be more correctly issued, and the necessary memory capacity for the recovery of a status can be more correctly calculated.

Described below are the analysis of data, a warning of the dangerous status, and the calculation of a necessary memory capacity for the recovery of a status depending on the characteristic of a generation type garbage collection by the memory use amount measurement and analysis unit 11.

A generation type garbage collection is managed by dividing memory (heap) into two areas, that is, a new generation and an old generation. When an object of a Java program is assigned to memory, it is first assigned to the memory of a new generation. When the memory of the new generation becomes full, the garbage collection of a new generation (hereinafter referred to as a new GC) occurs. An object remaining after experiencing several times of the new GC is transferred to the memory of an old generation. When the memory of an old generation becomes full, the garbage collection of the entire memory (hereinafter referred to simply as the garbage collection or the GC) occurs. Therefore, the memory use amount of a new generation largely fluctuates.

The API of Java described in the above mentioned third conventional technology includes an API for obtaining the total memory capacity and the free space of the memory capacity. However, when the API returns the total memory capacity including both of the new and old generations as data, the data cannot be graphed into the graph as shown in FIG. 6. Therefore, the data cannot be correctly analyzed. In the case of generation type garbage collection, the memory use amounts of the new and old generations are separately measured to analyze the data.

Figure 8A:
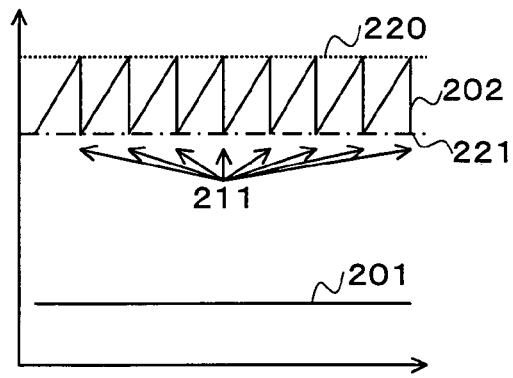
FIG. 8A to 8C are an explanatory view showing a status relating to an occurrence intervals of garbage collection in generation type garbage collection and a memory use amount.
Figure 8B:
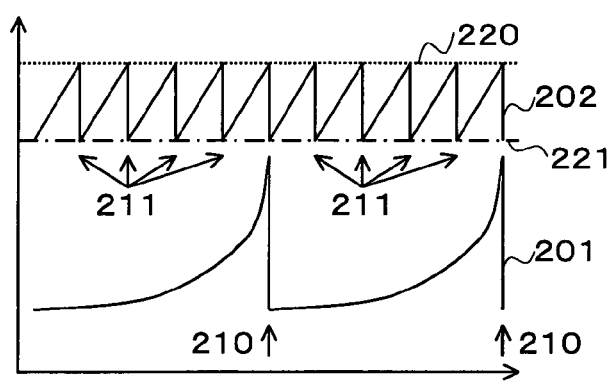
Figure 8C:
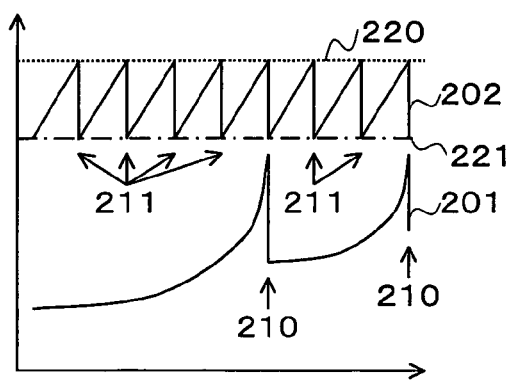

FIG. 8 is an explanatory view showing a status relating to the occurrence intervals of the garbage collection and the memory use amount in the generation type garbage collection. The graphs shown in FIGS. 8A to 8C are examples of graphing the change of the memory use amount of each of new and old generations (old generation 201 and new generation 202) and graphing the occurrence of the garbage collection (GC) 210 and new GC 211. These graphs show the three typical statuses relating to the occurrence intervals of the garbage collection 210 and the new GC 211 and the memory use amount (201, 202).

In the graphs shown in FIGS. 8A to 8C, the vertical axis indicates the memory capacity, and the horizontal axis indicates time. In FIGS. 8A and 8C, the dotted lines indicate the set maximum heap size 220, and the alternate long and short dashed lines indicates a boundary 221 of the area of the new and old generations. The area shown in a lower part than a dashed and dotted line is an area of the memory of an old generation. The area from the alternate long and short dashed lines to the dotted line (maximum heap size 220) is an area of the memory of a new generation. The solid line in each generation shows a change with time of the memory use amount (201, 202) of each generation. Each status shown in FIGS. 8A to 8C respectively corresponds to each status shown in FIGS. 6A to 6C.

When the memory use amount 202 of a new generation exceeds the memory capacity of a new generation due to an event of "assignment of memory" (or when it exceeds the maximum heap size 220 in FIG. 8), the Java virtual machine 1 executes the new GC 211, and releases the memory of the new generation. The Java virtual machine 1 also transfers the objects remaining in the memory of a new generation after experiences of the new GC 211 of several times to the memory of an old generation. When the memory of the old generation becomes full and no object can be transferred from the memory of the new generation, the Java virtual machine 1 performs the garbage collection 210 of the entire memory.

The frequency of occurrences of the new GC 211 is higher than the frequency of occurrences of the GC 210 of the entire memory. However, while the processing time of the GC 210 is several seconds or several tens of seconds, the processing time of the new GC 211 is several tens of milliseconds. In an application in which a response time is an important factor, it is necessary to maintain the status in which the GC 210 can be suppressed at the lowest possible level (FIG. 8A).

The GC 210 occurs when a large number of objects are transferred from a new generation to an old generation. That is, there is a case that there are a number of long-life objects, and a case that the memory size of a new generation is too small and an overflow occurs (or a case that an overflow algorithm of transferring objects to an old generation even if the generation is new). When the new GC 211 occurs, the necessary memory capacity to set the status as shown in FIGS. 8B and 8C into the status as shown in FIG. 8A can be estimated by measuring the size of objects (hereinafter referred to as an amount of an overflow) overflowing to the memory of the old generation from the memory of the new generation.

FIG. 9 is an explanatory view showing the measurement of the amount of the overflow. FIG. 9A shows the status in which objects overflow in the new GC 211 from the memory of a new generation 240 to the memory of an old generation 230, and the hatched portion refers to the amount the an overflow. Assuming that there is a sufficient amount of a memory capacity of the new generation 240 at the time of the occurrence of the new GC 211(the timing of generating the new GC 211 has been expanded), and the status at this time is represented as shown in FIG. 9B. By repeating the process each time the new GC 211 is performed., the status as shown in FIG. 9C is obtained.

Figure 9A:
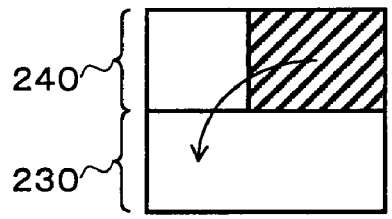
FIG. 9A to 9D are an explanatory view showing a measurement of an amount of an overflow.
Figure 9B:
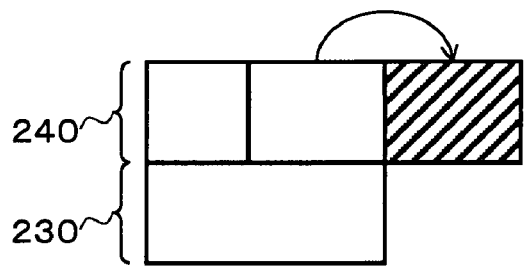
Figure 9C:
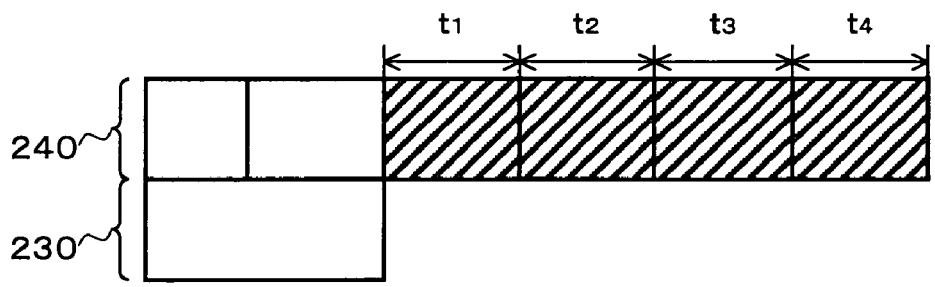

FIG. 9C shows the status in which it is assumed that there is an infinite amount of memory capacity of the new generation 240, and the objects, which overflowed in the fourth new GC 211 in actual, have not overflowed. When the k-th amount of an overflow is represented by $t_k$, the total amount of an overflow which is assumed not to have overflowed at the time shown in FIG. 9C is $t_1+t_2+t_3+t_4$. When there is an excess amount of memory of $t_1+t_2+t_3+t_4$ in addition to the original amount in the area of the new generation 240, then there are no objects overflowing from the new generation 240 up to the fourth new GC 211.

Furthermore, since there is an object not required as time passes, the following amount of an overflow can be estimated with the above mentioned object taken into account. For example, in FIG. 9C, assuming that the object overflowed in the first new GC 211 has not overflowed, and remains in the area of the new generation 240 up to the time of the fourth new GC 211, a part of it must be unnecessary objects. Similarly, there must be objects which overflow in the second and third new GC 211 but are not necessary by the time of the fourth new GC 211. In FIG. 9C, a part of the objects assumed not to have overflowed by the fourth new GC 211 can be released by the fourth new GC 211. Actually, FIG. 9C is in the status as shown in FIG. 9D.

Figure 9D:
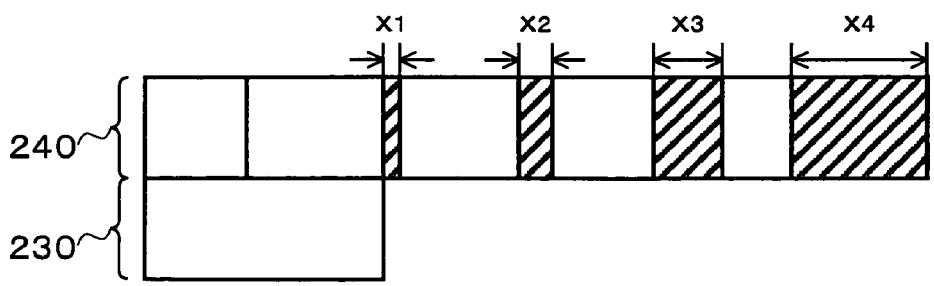

In FIG. 9D, when the survival rate of an object by the new GC 211 in one operation is represented by d, and the k-th amount of an overflow is represented by $x_k$, the following equations are established.

$$x_1 = t_1 \times d^3$$

$$x_2 = t_2 \times d^2$$

$$x_3 = t_3 \times d^1$$

$$x_4 = t_4 \times d^0$$

Accordingly, the amounts of overflows add up to $x_1+x_2+x_3+x_4$. Therefore, when the memory capacity of the new generation 240 includes an additional amount of $x_1+x_2+x_3+x_4$, it is assumed that no overflow has occurred.

Normally, the accumulation of the amount of an overflow of the n times of the new GC is obtained by the following equation (3). In the equation (3), $X_{total}$ indicates the accumulation of the amount of an overflow.

$$x_{total} = \Sigma_{k=1}^{n}(t_k \times d^{n-k}) \qquad \text{Equation (3)}$$

Described below is the determination logic of the danger of the memory shortage depending on the characteristic of the generation type garbage collection by the memory use amount measurement and analysis unit 11. The determination of the danger of the memory shortage in the generation type garbage collection is obtained by adding the following (determination 4) and (determination 5) to the above mentioned (determination 1) to (determination 3).

Also in the determination of the following generation type garbage collection, the following equation (4) replaces the equation (1) in the calculation of the memory use rate.

use rate=(memory use amount in old generation)/
(memory capacity in old generation)    Equation (4)

(determination 4) When the memory use amount after the garbage collection is measured and the memory use rate runs below the memory shortage warning threshold 106 (or although the free space of the memory has sufficiently recovered), it is determined that too small memory in the new generation affects the performance (enhances the frequency of occurrences of the GC) when the occurrence intervals of the GC run below the GC occurrence interval warning threshold 103 and the rate, or a value of (capacity in new generation)/(total memory capacity), of the memory capacity of the new generation runs below the new generation shortage warning threshold 108.

(determination 5) When the accumulation of the amount of an overflow is calculated by the equation (3) after each operation of the new GC, and a value of (accumulation of amount of overflow)/(free space in old generation) exceeds the overflow amount warning threshold 109, it is determined that there is the danger of the memory shortage error.

The memory use amount measurement and analysis unit 11 warns of a possible danger of a memory shortage error, warns of the danger of the reduction in performance due to the memory shortage, etc. based on the basic determination result indicated by the (determination 1) to (determination 3) and the determination result of the danger depending on the characteristic of generation type garbage collection indicated by the (determination 4) and (determination 5).

The memory use amount measurement and analysis unit 11 calculates the necessary memory capacity for the recovery of a status. For example, the memory size required for recovery in the (determination 1) to (determination 3) is a size calculated such that the free space rate (free space rate=1−use rate)

of memory after the garbage collection can exceed the memory space recovery threshold 107. The calculation obtains the value m (capacity to be added for recovery) satisfying the following equation (5).

$$\text{(free space in old generation}+m)/(\text{memory capacity in old generation}+m) > \text{memory space recovery threshold } \mathbf{107} \quad \text{Equation (5)}$$

For example, in the case of (determination 5), the memory capacity to be added and required for recovery is an accumulated amount of overflows obtained by the equation (3) for the new GC occurring between one GC and the subsequent GC.

The ratio of the memory area of a new generation to the memory area of an old generation in the generation type garbage collection as shown in FIG. 8 can be optionally set when the Java virtual machine 1 is activated. In the generation type garbage collection as shown in FIG. 8, the memory sizes of the new and old generations are constant, but there can be generation type garbage collection which dynamically changes the memory sizes of the new and old generations.

FIG. 10 is an explanatory view of the occurrence intervals and the status of the memory use amount of the garbage collection in the generation type garbage collection which dynamically changes a size. In the generation type garbage collection which dynamically changes a size as shown in FIG. 10, the free space immediately after the garbage collection 210 is assigned to the memory areas of the new and old generations at a preset ratio.

Figure 10A:
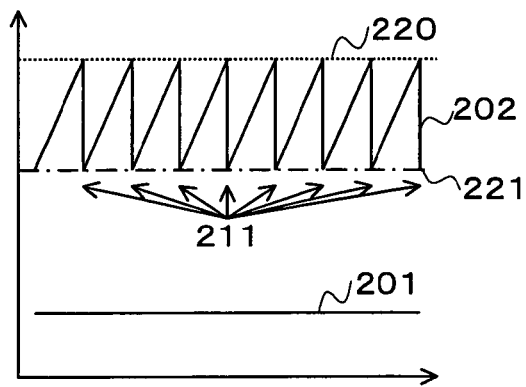
FIGS. 10A to 10C are an explanatory view showing a status relating to an occurrence intervals of garbage collection in generation type garbage collection in dynamically changing a size and a memory use amount.
Figure 10B:
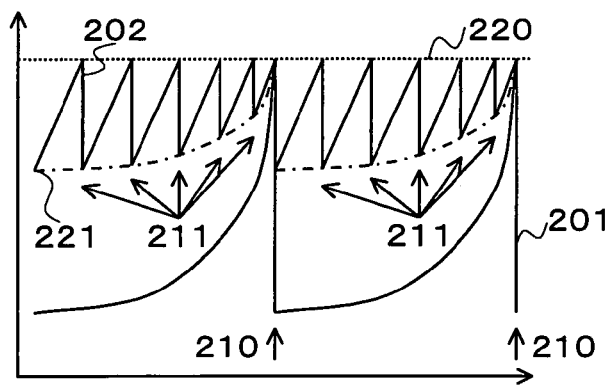
Figure 10C:
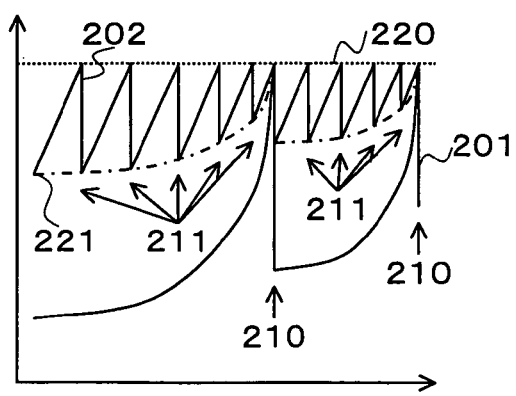

FIGS. 10A to 10C show an example of graphing a change in memory use amount (old generation 201 and new generation 202) of the new and old generations and the occurrence of the GC 210 and the new GC 211, and show the three typical statuses relating to the occurrence intervals of the GC 210 and the new GC 211 and the memory use amounts.

In the graphs shown in FIGS. 10A to 10C, the vertical axis indicates the memory capacity, and the horizontal axis indicates time. In FIGS. 10A to 10C, the dotted lines indicates the set maximum heap sizes 220, the alternate long and short dashed lines indicate the boundaries 221 between the memory areas of the new and old generation. The area below the alternate long and short dashed lines refers to an area of the memory of the old generation, and the area from the alternate long and short dashed lines to the dotted line (maximum heap size 220) is the area of the memory of the new generation. The solid line in each generation indicates a change with time of the memory use amount (201, 202) of each generation. Each status shown in FIGS. 10A to 10C corresponds to each status shown in FIGS. 6A to 6C.

The Java virtual machine 1 performs the new GC 211 when the memory use amount 202 of the new generation exceeds the memory capacity of the new generation in the event of "memory allocation" (when it exceeds the maximum heap size 220 in FIG. 10), and releases the memory of the new generation. Additionally, the Java virtual machine 1 experiences the new GC 211 several times, and transfers the objects remaining in the memory of the new generation to the memory of the old generation. The memory of the new generation is reduced by the amount transferred to the old generation, and the memory of the old generation increases correspondingly.

When the memory of the old generation becomes full, the Java virtual machine 1 performs the GC 210 on the entire memory. At this time, the free space immediately after the garbage collection 210 is distributed to the memory area of the new generation and the memory area of the old generation at a predetermined rate.

The determination of the danger of the memory shortage in the generation type garbage collection which dynamically changes a size performed by the memory use amount measurement and analysis unit 11 can be the above mentioned (determination 1) to (determination 3) and (determination 5). In the generation type garbage collection which dynamically changes a size, the equation (1) is used in the calculation of a use rate.

The memory use amount measurement and analysis unit 11 warns of the danger of the memory shortage error, warns of the reduction of the performance due to the memory shortage, etc. based on the determination result of a possible danger indicated by the (determination 1) to (determination 3) and (determination 5).

The memory use amount measurement and analysis unit 11 calculates the memory capacity required in the recovery of a status. In the generation type garbage collection which dynamically changes a size, the calculation of the memory capacity required for the recovery is performed by improving the above mentioned equation (2). For example, the memory size required for the recovery in the cases indicated by the (determination 1) to (determination 3) is calculated such that the ratio of the free space of the old generation to the entire capacity after the garbage collection can exceed the memory space recovery threshold 107. The calculation is performed to obtain the value m (capacity to be added for the recovery) satisfying the following equation (6).

$$\text{(free space of old generation}+\text{distribution ratio of old generation} \times m)/(\text{total memory capacity}+m) > \text{memory space recovery threshold } \mathbf{107} \quad \text{Equation (6)}$$

The memory capacity to be added for the recovery in the case of the (determination 5) is the same as the capacity in the case of the above mentioned generation type garbage collection.

The example of the process of the memory use amount measurement and analysis unit 11 is explained below by referring to the flowcharts shown in FIGS. 11 to 15.

In the flowcharts shown in FIGS. 11 to 15, the "non-dynamic generation type GC" refers to the generation type garbage collection which does not dynamically change a memory size of the new and old generations. The dynamic generation type GC refers to generation type garbage collection which dynamically changes a size. "GC" indicates the garbage collection on the entire memory, and "new-GC" refers to the garbage collection of the new generation in the generation type GC.

Figure 11:
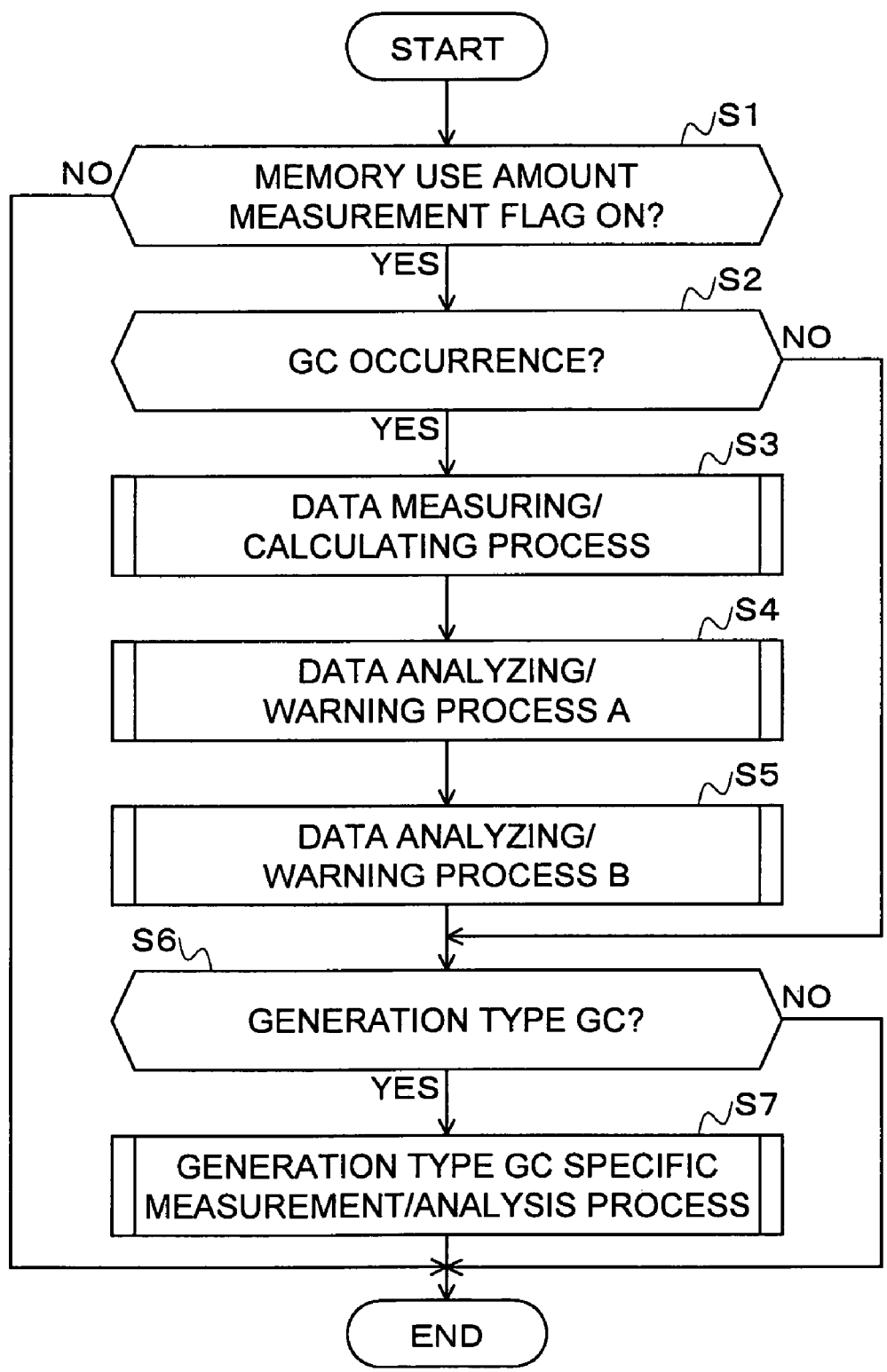

FIG. 11 is a flowchart of the memory use amount measuring and analyzing process.

First, it is determined whether or not the memory use amount measurement flag 101 is turned ON (step S1). When it is not turned ON (placed in the OFF state), the process terminates.

When it is turned ON in step S1, it is determined whether or not the GC has occurred (step S2). When the GC has not occurred, the process is passed to step S6.

Figure 12:
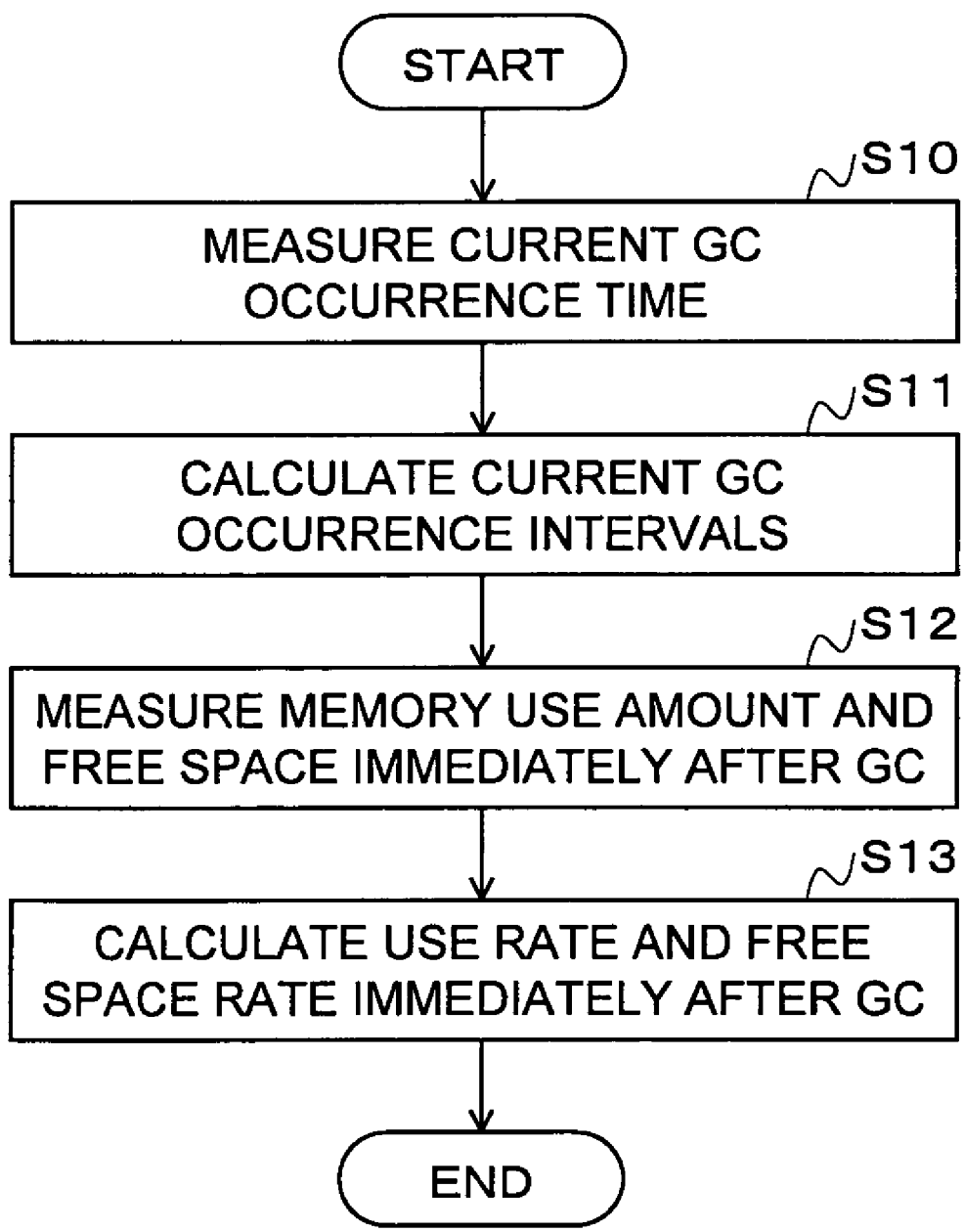
Figure 13:
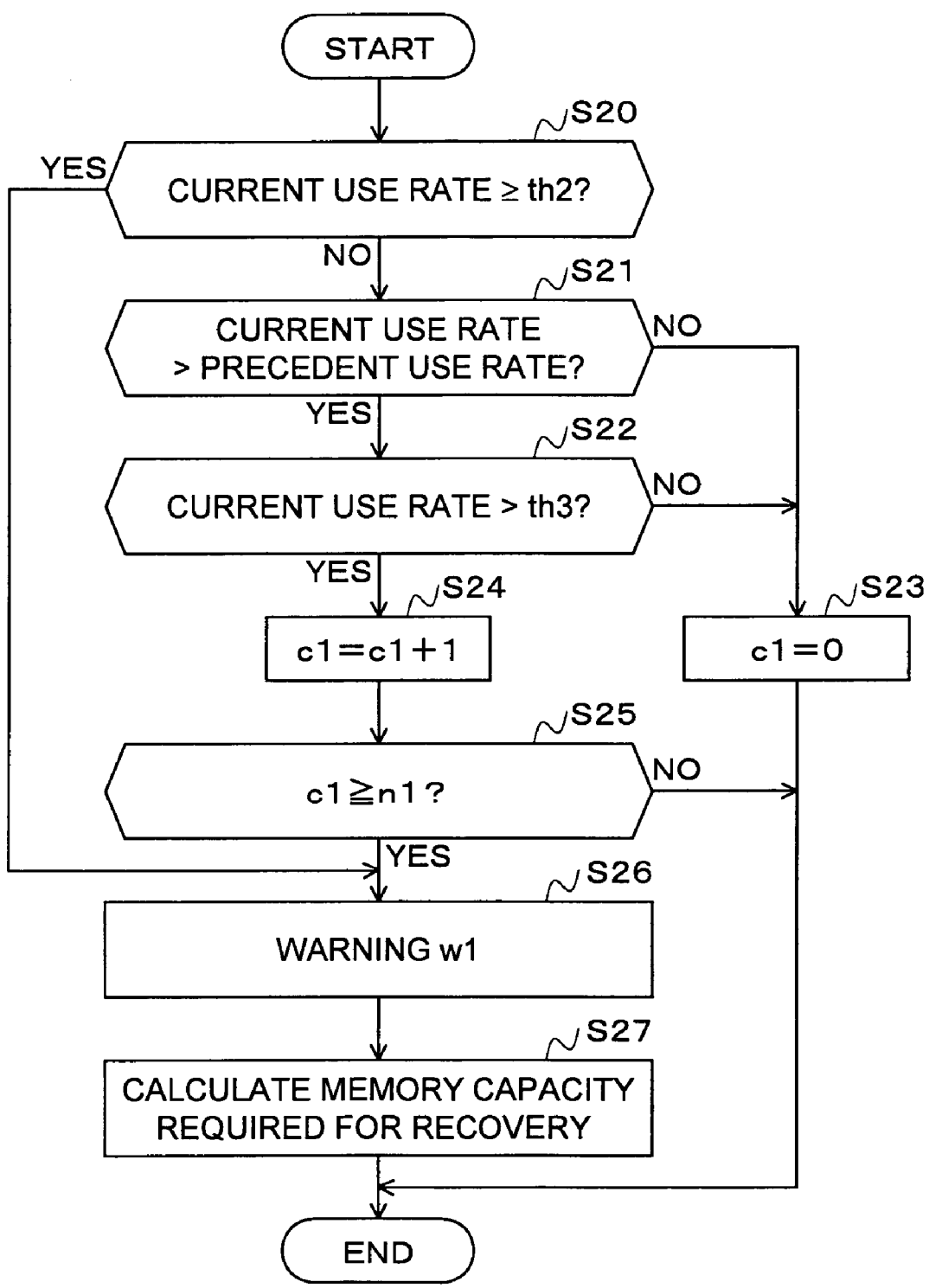
Figure 14:
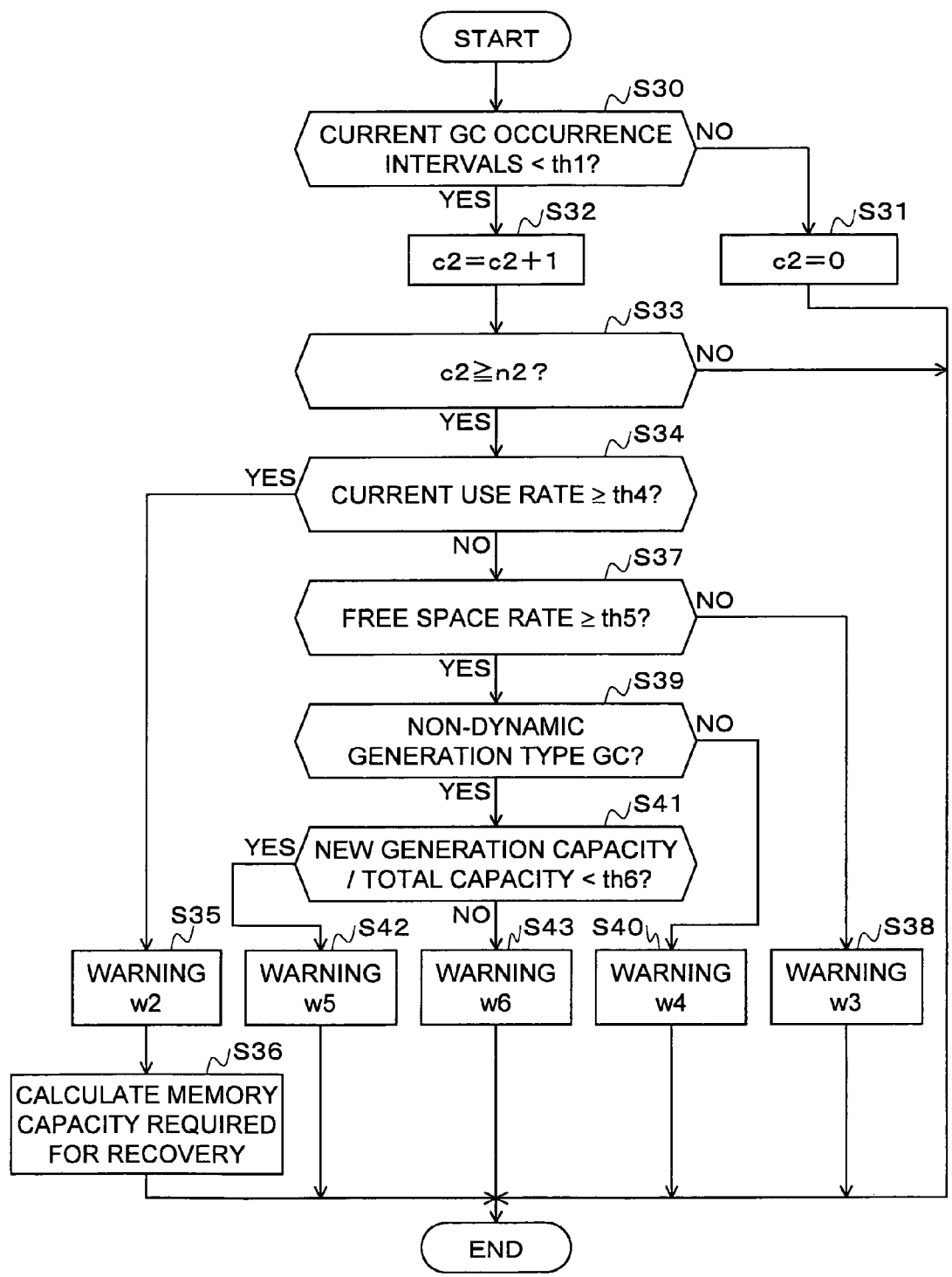

When the GC has occurred in step S2, the data measuring/calculating process shown in FIG. 12 is performed (step S3), the data analyzing/warning process A shown in FIG. 13 is performed (step S4), the data analyzing/warning process B shown in FIG. 14 is performed (step S5), and the process is passed to step S6.

It is determined whether or not the garbage collection is generation type GC (step S6). When it is not generation type GC, the process terminates.

When it is generation type GC in step S6, the generation type GC specific measurement/analysis process shown in FIG. 15 is performed (step S7), thereby terminating the process.

FIG. 12 is a flowchart of the data measuring/calculating process.

First, the current GC occurrence time is measured (step S10), and the current GC occurrence interval (current GC occurrence time-preceding GC occurrence time) is calculated (step S11). Then, the memory use amount and the free space immediately after the GC are measured (step S12), the memory use rate and the free space rate (free space rate=1−use rate) immediately the GC are calculated (step S13), thereby terminating the process.

In step S12, when the garbage collection is generation type GC, a measurement is performed not on the entire memory, but on the memory of the old generation. In the calculation of the memory use rate in step S13, when the garbage collection is not generation type GC and when it is dynamic generation type GC, calculation is performed by the equation (1). When it is non-dynamic generation type GC, calculation is performed by the equation (4).

FIG. 13 is a flowchart of the data analyzing/warning process A.

First, it is determined whether or not "(current use rate) ≧th2 (or the first memory shortage error warning threshold 104)" is satisfied (step S20). When it is satisfied, the process is passed to step S26.

When it does not hold in step S20, it is determined whether or not "current use rate>preceding use rate" is satisfied (step S21). When it does not hold, the counter c1 for count of the continuous increase of the memory use rate is set to 0 (step S23), thereby terminating the process.

When it is satisfied in step S21, it is determined whether or not "(current use rate)>th3 (or the second memory shortage error warning threshold 105)" is satisfied (step S22). When it does not hold, the counter c1 for count of the continuous increase of the memory use rate is set to 0 (step S23), thereby terminating the process.

When it is satisfied in step S22, the counter c1 is incremented by 1 (c1=c1+1) (step S24).

It is determined whether or not the counter c1 is an optionally set value n1 or more (step S25). When it is the value n1 or more, the process is passed to step S26. When it is not the value n1 or more in step S25, the process terminates.

In step S26, a warning of the danger of the memory shortage error (warning w1) is issued, the memory capacity required for recovery is calculated (step S27), and the process terminates.

In the calculation of the memory capacity required for the recovery in step S27, when the garbage collection is not generation type GC, the calculation for obtaining the value m (capacity to be added for recovery) satisfying the equation (2) is performed. When it is non-dynamic generation type GC, the calculation for obtaining the value m (capacity to be added for recovery) satisfying the equation (5) is performed. When it is dynamic generation type GC, the calculation for obtaining the value m (capacity to be added for recovery) satisfying the equation (6) is performed.

FIG. 14 is a flowchart of the data analyzing/warning process B.

First, it is determined whether or not "current GC occurrence interval<th1 (GC occurrence interval warning threshold 103)" is satisfied (step S30). When it does not hold, the counter c2 for count of the GC occurrence intervals continuously running below the GC occurrence interval warning threshold 103 is set to 0 (step S31), thereby terminating the process.

When the above mentioned condition is satisfied in step S30, the counter c2 is incremented by 1 (c2=c2+1) (step S32).

It is determined whether or not the counter c2 is the value n2 (optionally set in advance) or more (step S33). When c2 is not n2 or more, the process terminates.

In step S33, when c2 is value n2 or more, then it is determined whether or not "current use rate≧th4 (memory shortage warning threshold 106)" is satisfied (step S34). When it is satisfied, a warning of reduced performance due to the memory shortage (warning w2) is issued (step S35), the memory capacity required for recovery is calculated (step S36), and the process terminates.

In the calculation of the memory capacity required for the recovery in step S36, when the garbage collection is not generation type GC, the calculation for obtaining the value m (capacity to be added for recovery) satisfying the equation (2) is performed. When it is non-dynamic generation type GC, the calculation for obtaining the value m (capacity to be added for recovery) satisfying the equation (5) is performed. When it is dynamic generation type GC, the calculation for obtaining the value m (capacity to be added for recovery) satisfying the equation (6) is performed.

When it does not hold in step S34, it is determined whether or not "free space rate≧th5 (memory space recovery threshold 107)" is satisfied (step S37). When it does not hold, a warning (warning w3) of occurrence of the GC in a short interval is issued (step S38), thereby terminating the process.

When it is satisfied in step S37, it is determined whether or not the garbage collection is non-dynamic generation type GC (step S39). When it is not non-dynamic generation type GC, a warning (warning w4) such as "the absolute amount of the memory is smaller than the consumption speed of the memory" is issued (step S40), thereby terminating the process.

When the garbage collection is non-dynamic generation type GC in step S39, it is determined whether or not "(new generation capacity)/(total memory capacity)<th6 (or the new generation shortage warning threshold 108)" is satisfied (step S41). When it is satisfied, a warning (warning w5) of a small ratio of the new generation is issued (step S42), thereby terminating the process.

When it does not hold in step S41, a warning (warning w6) such as "an absolute amount of memory is small relative to the memory consumption speed", "the ratio of the capacity of a survivor is small", etc. is issued (step S43), thereby terminating the process.

FIG. 15 is a flowchart of the generation type GC specific measurement/analysis process.

First, it is determined whether or not the new-GC has occurred (step S50). When it has not occurred, the process terminates.

When the new-GC has occurred in step S50, it is determined whether or not it is the first new-GC after the GC (step S51). When it is not the first new-GC, the process is passed to step S53. When it is the first new-GC in step S51, the value n is set to 1 (step S52), thereby passing control to step S53.

The amount of objects overflowing from the new generation to the old generation is measured (step S53), and the accumulation of the amount of an overflow is calculated using the equation (3) (step S54).

Then, it is determined whether or not "(accumulation of amount of an overflow)/(free space of old generation)>th7 (or the overflow amount warning threshold 109)" is satisfied (step S55). When it does not hold, the process is passed to step S58.

When it is satisfied in step S55, a warning (warning w1) of the danger of the memory shortage error is issued (step S56), the accumulation of the amounts of overflows calculated in step S54 is defined as the memory capacity to be added for the recovery (step S57), thereby passing control to step S58.

The value n is incremented by 1 (n=n+1) (step S58), thereby terminating the process.

Figure 16A:
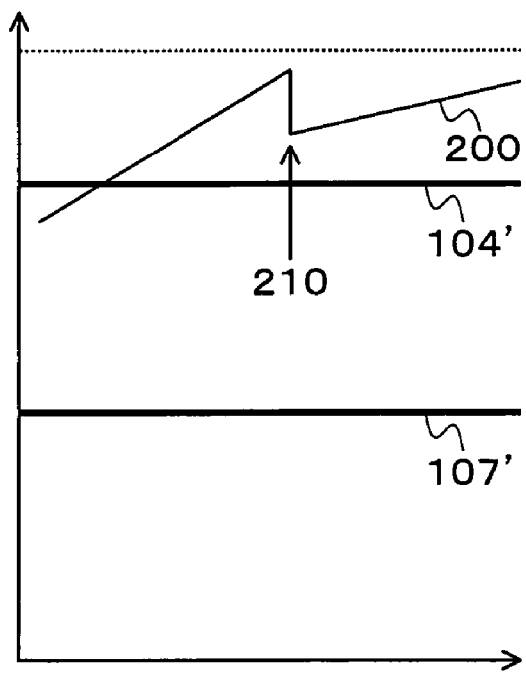
FIGS. 16A and 16B and FIGS. 17A to 17C show an example of a status to be a warning target of a memory use amount measurement and analysis unit.
Figure 16B:
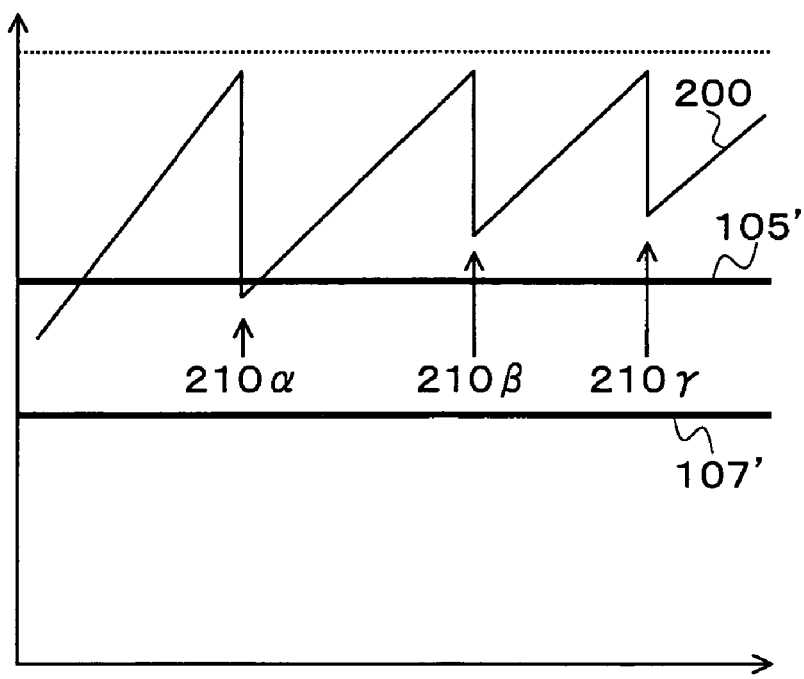

FIG. 16 shows an example (1) of the status to be warned of by the memory use amount measurement and analysis unit. FIGS. 16A and 16B respectively correspond to each determination condition shown in FIG. 13. In the graphs shown in FIGS. 16A and 16B, the vertical axis indicates a memory capacity and the horizontal axis indicates time.

In FIG. 16A, the bold line 104' shows a value obtained by (total memory capacity)×(the first memory shortage error warning threshold 104). In FIG. 16B, the bold line 105' shows a value obtained by (total memory capacity)×(the second memory shortage error warning threshold 105). In FIGS. 16A and 16B, the bold line 107' shows a value obtained by (total memory capacity)×(1−(the memory space recovery threshold 107)).

FIG. 16A shows an example of the case in which step S20 shown in FIG. 13 is satisfied. In FIG. 16A, the change in the memory use amount 200 shows almost no recovery of free space in the memory due to the GC 210. Since the memory use amount 200 after the GC 210 exceeds the bold line 104', it is apparent that the memory use rate exceeds the first memory shortage error warning threshold 104. The first memory shortage error warning threshold 104 is, for example, 90% to 95% approximately.

FIG. 16B shows an example of the case in which steps S21, S22 and S25 shown in FIG. 13 hold concurrently. In FIG. 16B, the change in the memory use amount 200 shows that the free space of the memory gradually fails to recover in the order of GC 210α, 210β, and 210γ. After the GC 210β, the memory use amount 200 after the GC 210γ continuously exceeds the bold line 105'. Therefore, after the GC 210β, the use rate of each unit of the memory after the GC 210γ exceeds the second memory shortage error warning threshold 105.

Figure 17A:
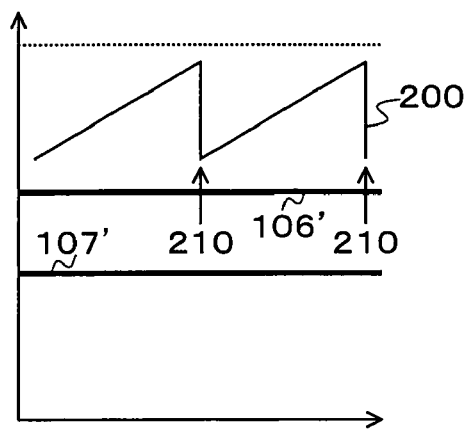
Figure 17B:
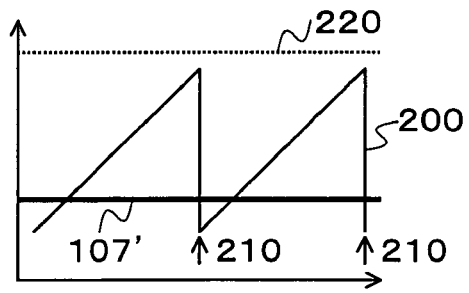
Figure 17C:
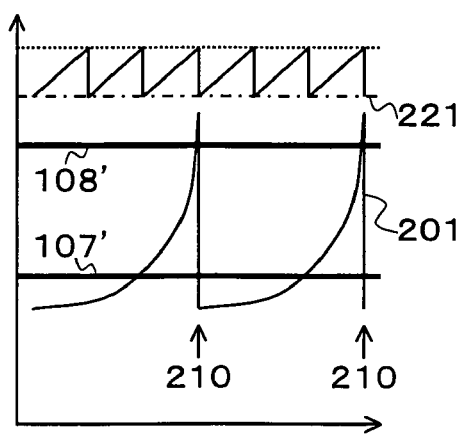

FIG. 17 shows an example (2) of the status to be warned of by the memory use amount measurement and analysis unit. FIGS. 17A to 17C respectively correspond to each determination condition shown in FIG. 14. In the graphs shown in FIGS. 17A to 17C, the vertical axis indicates a memory capacity and the horizontal axis indicates time.

In FIG. 17A, the bold line 106' shows a value obtained by (total memory capacity)×(memory shortage warning threshold 106). In FIG. 17C, the bold line 108' shows a value obtained by (total memory capacity)×(1−(new generation shortage warning threshold 108)). In FIGS. 17A to 17C, the bold line 107' shows a value obtained by (total memory capacity)×(1−(memory space recovery threshold 107)).

FIG. 17A shows an example of the case in which step S34 shown in FIG. 14 is satisfied. In FIG. 17A, the change in the memory use amount 200 shows some recovery of free space in the memory due to the GC 210, but the GC occurrence intervals are shorter. Since the memory use amount 200 after the GC 210 exceeds the bold line 106', it is certain that the memory use rate exceeds the memory shortage warning threshold 106. The memory shortage warning threshold 106 is, for example, 80% to 90% approximately.

FIG. 17B shows an example in which step S37 shown in FIG. 14 is satisfied, and an example in which the garbage collection is not generation type GC. In FIG. 17B, a change in the memory use amount 200 shows that the free space of the memory has recovered by the GC 210. Since the memory use amount 200 after the GC 210 runs below the bold line 107', it is certain that the free space rate of the memory exceeds the memory space recovery threshold 107.

However, the GC occurrence intervals are shorter because the absolute amount of memory (maximum heap size 220) is small, etc. The memory space recovery threshold 107 is, for example, 50% to 60% approximately.

FIG. 17C shows an example in which step S41 shown in FIG. 14 is satisfied, and shows an example of non-dynamic generation type GC. In FIG. 17C, a change in the memory use amount 201 of the old generation shows the recovery of the free space of the memory by the GC 210. Additionally, since the memory use amount 201 of the old generation after the GC 210 runs below the bold line 107', the free space rate of the memory exceeds the memory space recovery threshold 107.

However, the GC occurrence intervals are short. Since the boundary 221 of the memory of the old generation and the memory of the new generation exceeds the bold line 108', it is certain that the ratio of the capacity of the memory of the new generation to the entire capacity of the memory runs below the new generation shortage warning threshold 108 because the capacity of the new generation is small. The new generation shortage warning threshold 108 is, for example, 5% to 10% approximately.

Described below is the thread measurement and analysis unit 12 for determining by measurement and analysis whether or not the thread of the Java application has a deadlock, and issuing a warning.

The status of a thread of Java can be "being executed", "during standby in an executable status", "in suspend mode", "in sleep mode", "during standby in a wait state for release of lock", etc.

As described above in the fourth conventional technology, the state transition of a thread can be measured by an event of a Java virtual machine profiler interface. Practically, there is a product for detecting a thread in a deadlock by checking the status of the thread by analyzing the events.

However, a state transition of a thread very frequently occurs, and measuring all these events causes a heavy load to the operation of an application. Therefore, a deadlock is to be detected at the development stage by measuring and analyzing the state transition of a thread by an event of a Java virtual machine profiler interface.

On the other hand, in the present system, the thread measurement and analysis unit 12 periodically measures the status of a thread at intervals without applying a heavy load to an application. Furthermore, it also records a thread on standby in a wait state for a release of a lock, and confirms whether or not the same thread is in the standby status and awaiting the release of a lock in the next measurement. When it is continuously in a standby status, the number of continuous operations is counted. When there are two or more threads having the number of continuous operations of standby status in a lock release wait state exceeding the deadlock warning threshold 110, it is determined that there is the danger of a deadlock.

Thus, when an application is operated, the danger of a deadlock can be detected without a load applied to the operation.

Figure 18:
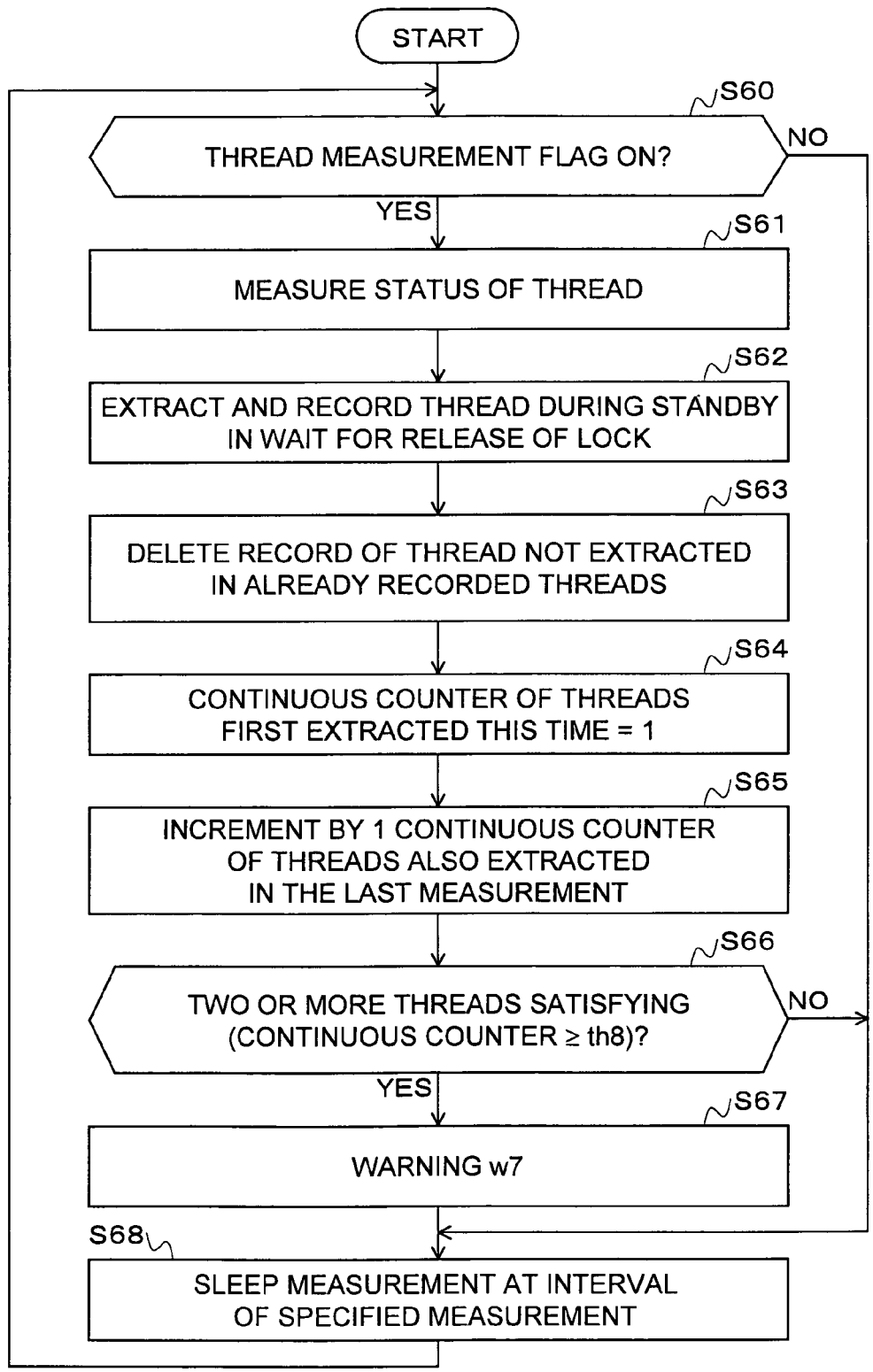
FIG. 18 is a flowchart of a thread measuring/analyzing process.

FIG. 18 is a flowchart of the thread measuring/analyzing process.

First, it is determined whether or not the thread measurement flag 102 is turned ON (step S60). When it is not turned ON (in the OFF state), the process is passed to step S68.

When it is turned ON in step S60, the statuses of all threads are measured (step S61), and the thread on standby in a wait state for the release of the lock is extracted and recorded (step S62). Additionally, in the already recorded threads, the records of the threads not extracted this time are deleted (step S63).

The counter of the continuous standby status of the thread first extracted this time (hereinafter referred to as a continuous counter) is set to 1 (step S64), and the continuous counter of the thread also extracted in the last measurement is incremented by 1 (step S65).

Then, it is determined whether or not there are two or more threads satisfying "continuous counter≧th8 (deadlock warning threshold 110)" (step S66). When there are not two or more threads, the process is passed to step S68.

When there are two or more threads in step S66, a warning of the danger of a deadlock (warning w7) is issued (step S67), thereby passing control to step S68.

The measurement of the thread status is kept to sleep (step S68) at a measurement interval specified by an option when the Java virtual machine 1 is activated or by a command from the Java virtual machine control unit 20 (described later) of the application server 2, thereby returning control to step S60.

As described above, according to the present system, all state transitions of threads are not measured, but an algorithm of determination by periodical measurement is adopted. Therefore, a warning of the danger of a deadlock of a thread can be issued without a load applied to the operation environment of an application.

Described below is the technological means for the Java virtual machine 1 notifying an upper layer (application server 2) of an analysis result for feedback of the optimum operation environment.

Figure 19:
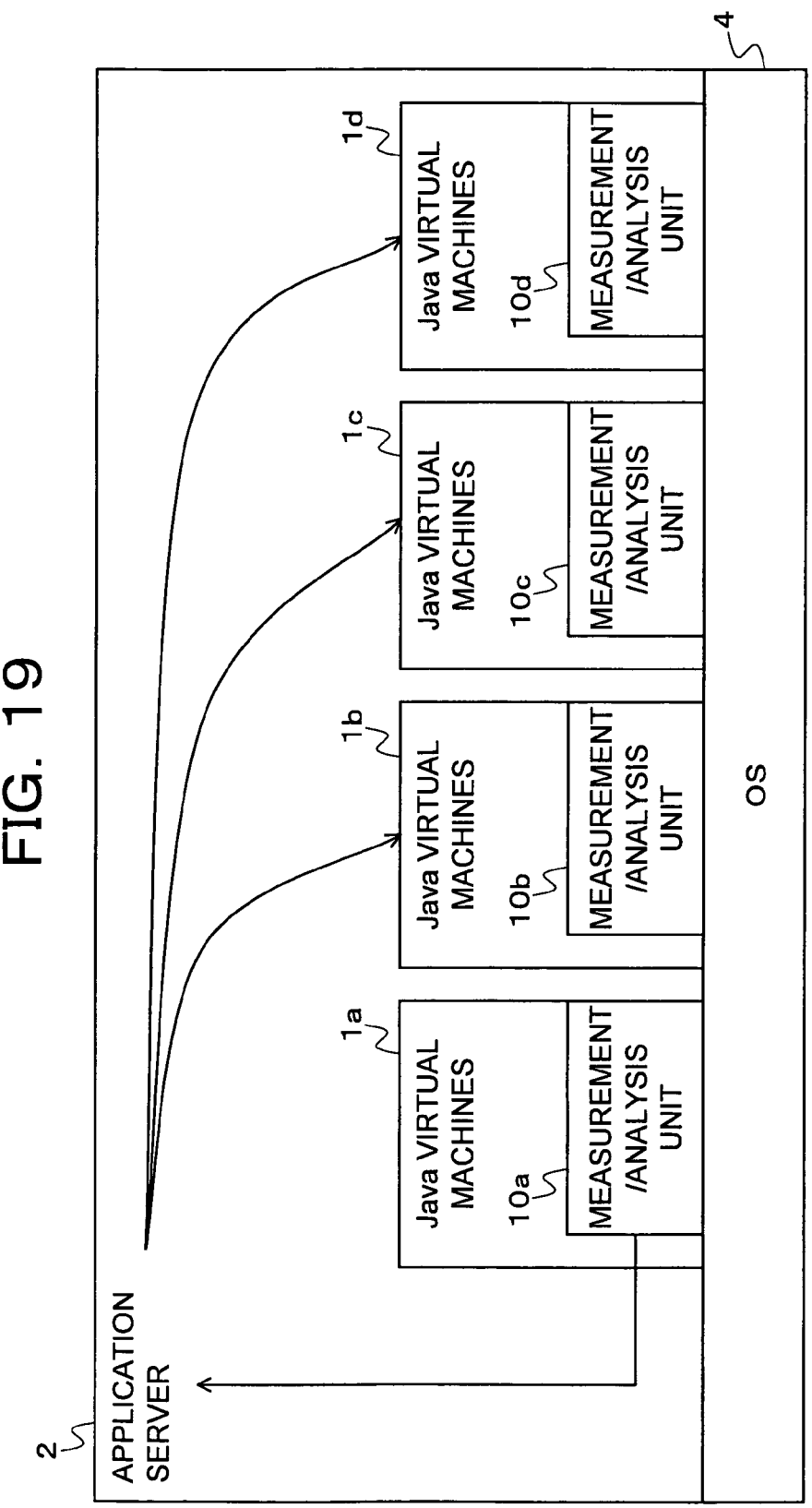
FIG. 19 shows an allocation of a process to a Java virtual machine by cooperation of a Java virtual machine and an application server.

FIG. 19 shows allocating processes of requests from the client to Java virtual machines by the cooperation of the Java virtual machines and the application server. In the system shown in FIG. 19, four Java virtual machines 1*a* to 1*d* are arranged in the upper layers of the OS 4, and each machine has measurement/analysis unit 10*a* to 10*d*. The application server 2 is arranged as an upper layer of the Java virtual machines 1*a* to 1*d*.

Each of the Java virtual machines 1*a* to 1*d* is activated by the application server 2 as an upper layer. Each of the Java virtual machines 1*a* to 1*d* is closely related to the application server 2. The application server 2 activates a plurality of Java virtual machines 1*a* to 1*d*, allocates a request from a client to each of the Java virtual machines 1*a* to 1*d*, and executes an application which processes the allocated request from the client.

An analysis result performed by the measurement/analysis unit 10*a* to 10*d* in each of the Java virtual machines 1*a* to 1*d* is directly transmitted as a notification to the application server 2. The application server 2 feeds back the notification of the received analysis result to the operation environment of the application, and allocates a request from the client appropriately to the Java virtual machines 1*a* to 1*d*.

For example, assume that the Java virtual machine 1*a* notifies the application server 2 of a possible danger of a memory shortage error due to the memory shortage. The application server 2 stops the allocation of the process to the Java virtual machine 1*a*, so that the Java virtual machine 1*a* terminates the process being performed. Then, the application server 2 can allocate processes to new Java virtual machines 1*b* to 1*d*.

Described below is the cooperation between the Java virtual machine 1 and the application server 2.

Figure 20:
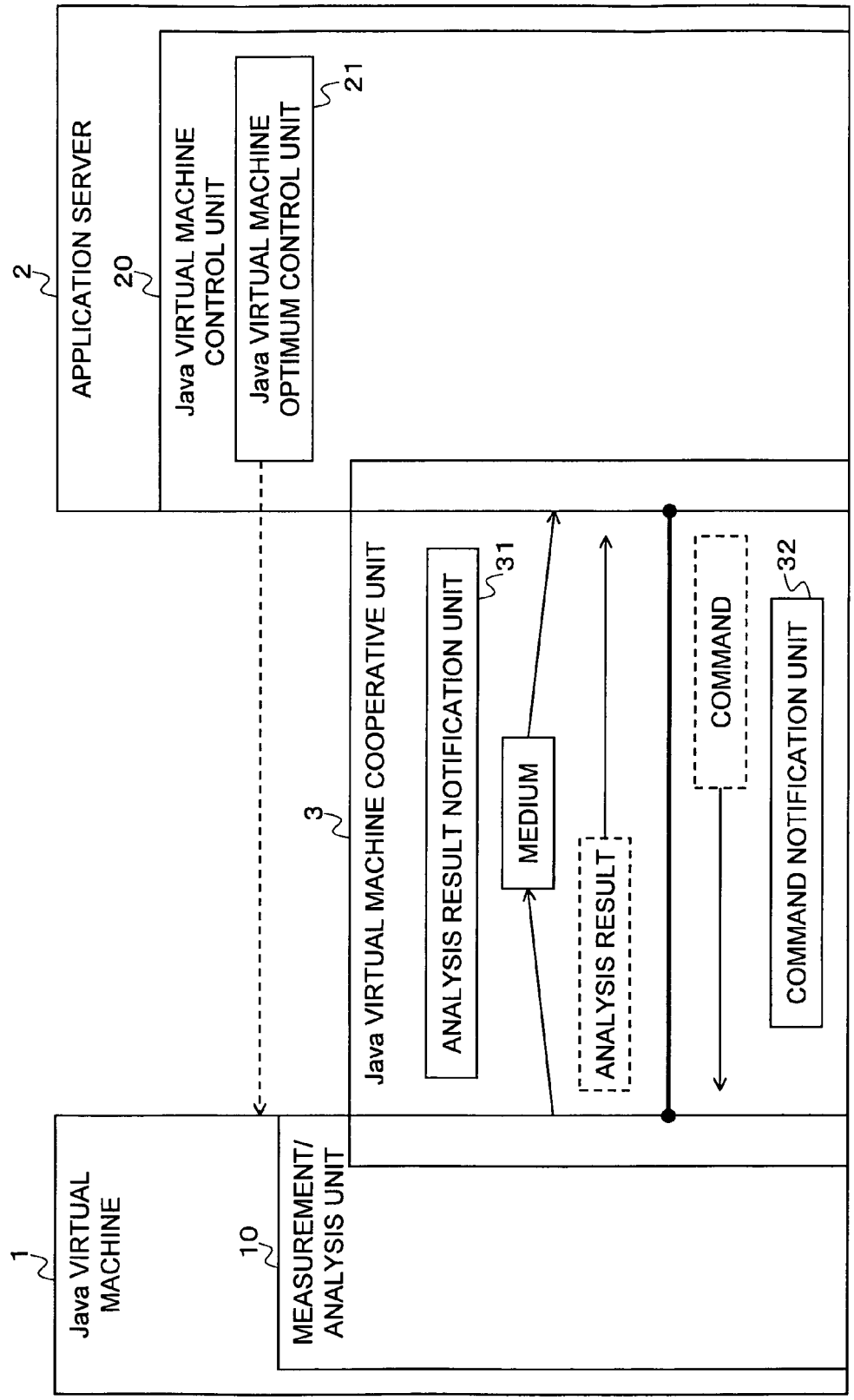
FIG. 20 shows cooperation between a Java virtual machine and an application server.

FIG. 20 shows the cooperation between a Java virtual machine and an application server. The Java virtual machine control unit 20 in the application server 2 activates and stops the Java virtual machine 1, and allocates the process of an application to the Java virtual machine 1. The Java virtual machine control unit 20 and the Java virtual machine 1 cooperate with each other through the Java virtual machine cooperative unit 3.

The Java virtual machine cooperative unit 3 comprises the analysis result notification unit 3 1. The analysis result notification unit 3 1 has the function of transmitting an analysis result directly in the inter-process communications, and the function of transmitting an analysis result through a medium such as a file, etc.

The measurement/analysis unit 10 of the Java virtual machine 1 transmits an analysis result to the Java virtual machine control unit 20 using the analysis result notification unit 3 1.

The Java virtual machine control unit 20 controls the activation and stop of the Java virtual machine 1 and allocates the process of an application to a Java virtual machine based on an analysis result transmitted by the analysis result notification unit 3 1. In the Java virtual machine control unit 20, the means for activating and stopping the Java virtual machine 1 and optimally allocating an application to the Java virtual machine 1 based on the information from the Java virtual machine 1 is the Java virtual machine optimum control unit 21.

The Java virtual machine cooperative unit 3 also comprises the command notification unit 3 2. The command notification unit 3 2 transmits a command directly in the communications among processes.

The Java virtual machine control unit 20 transmits a command to start/stop the measurement and the analysis for each type of measurement, a command to set/change a threshold for use in determination of an analysis result, a command to perform forcible garbage collection, etc. using the command notification unit 3 2. For example, when a warning is not transmitted for a long time, the Java virtual machine control unit 20 can use the command notification unit 3 2 to transmit a command to stop the measurement of a memory use amount or the like to the Java virtual machine 1.

FIG. 21 is a flowchart of the analysis result notifying process. In FIG. 21, the analysis result notifying process is explained by dividing it into the process of the measurement/analysis unit 10 of the Java virtual machine 1 and the process of the Java virtual machine control unit 20 of the application server 2.

Figure 21A:
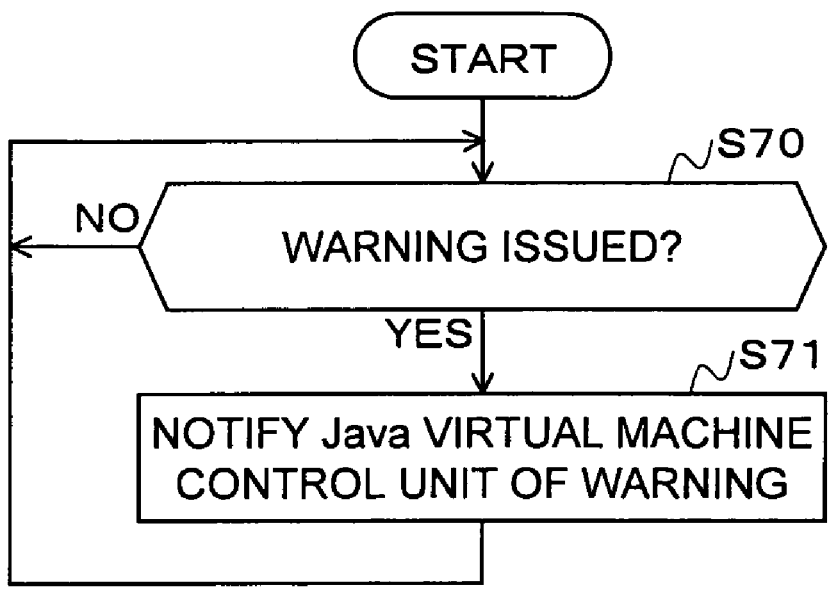
FIGS. 21A and 21B are a flowchart of an analysis result notifying process.

FIG. 21A is a flowchart of the analysis result notifying process on the measurement/analysis unit 10. The measurement/analysis unit 10 determines whether or not there is a warning (step S70). When there is a warning, it notifies the Java virtual machine control unit 20 of the warning through the analysis result notification unit 3 1 (step S71). In this case, when there is the information about the memory capacity required for recovery, it is also included in the notification. A warning can be transmitted in an inter-process communication, or output to a log file.

Figure 21B:
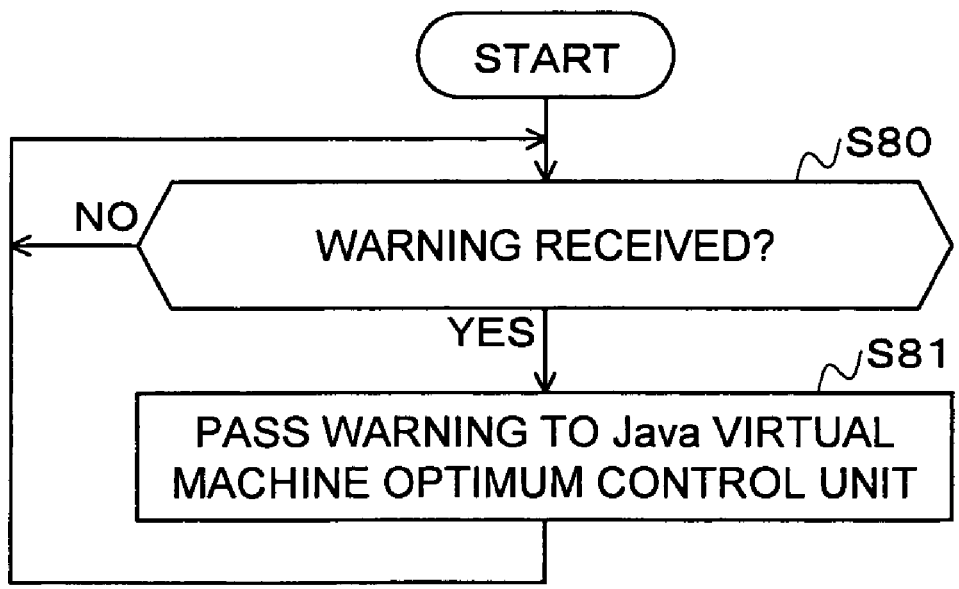

FIG. 21B is a flowchart of the analysis result notifying process of the Java virtual machine control unit 20. The Java virtual machine control unit 20 determines whether or not a warning has been received (step S80). When received, the warning is passed to the Java virtual machine optimum control unit 21 (step S81). In this case, when the information about the memory capacity required for recovery is received, it is also included in the notification.

FIG. 22 is a flowchart of the command notifying process. In this specification, the command notifying process is explained by dividing the process into the process of the Java virtual machine control unit 20 of the application server 2 and the process of the measurement/analysis unit 10 of the Java virtual machine 1.

Figure 22A:
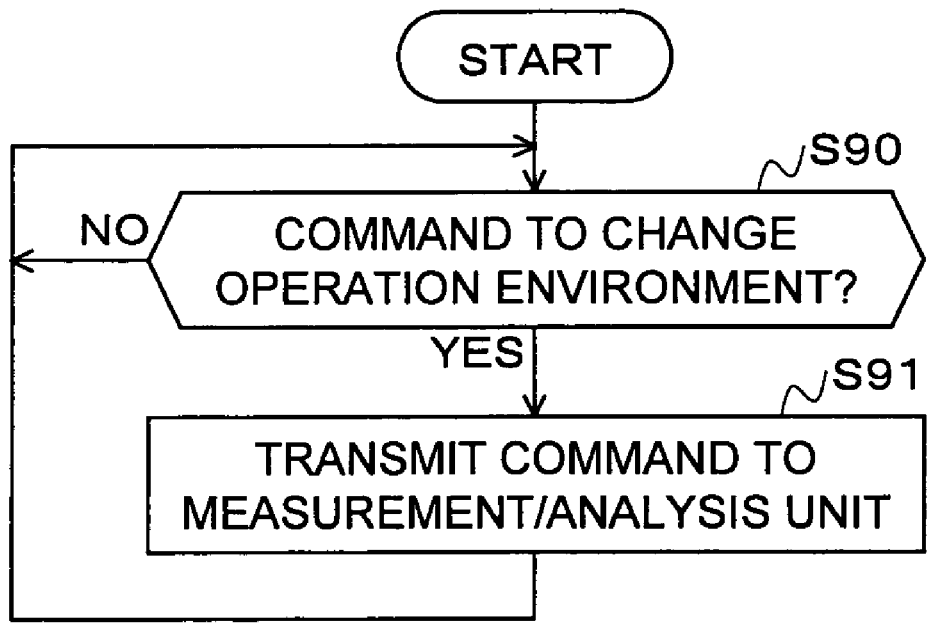
FIGS. 22A and 22B are a flowchart of a command notifying process.

FIG. 22A is a flowchart of the command notifying process of the Java virtual machine control unit 20. The Java virtual machine control unit 20 determines whether or not there is a command for the measurement/analysis unit 10 to change an operation environment (step S90). When there is a command, a command to change the settings is transmitted to the measurement/analysis unit 10 using the command notification unit 32 (step S91). The command is transmitted in an inter-process communication.

Examples of commands to change an operation environment are listed below:
(1) memory use amount measurement start command;
(2) memory use amount measurement stop command;
(3) thread measurement start command;
(4) thread measurement terminate command;
(5) threshold set/change command; and
(6) forcible garbage collect command.

Figure 22B:
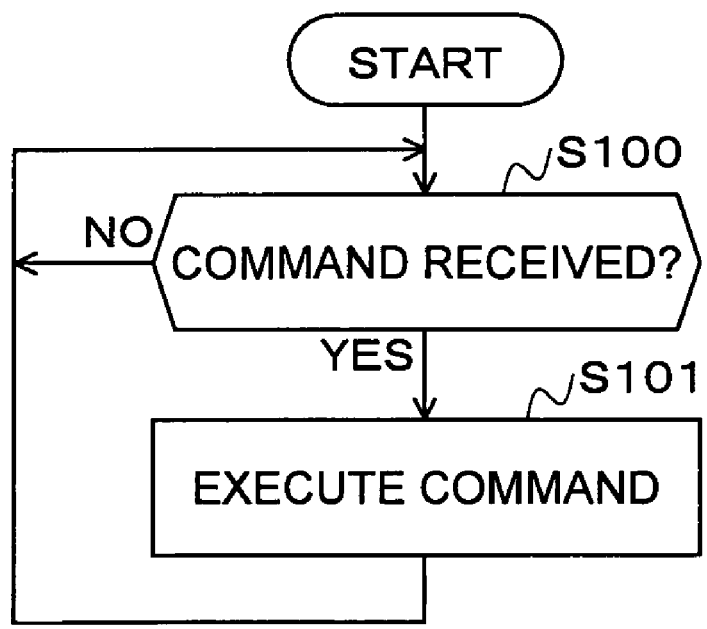

FIG. 22B is a flowchart of the command notifying process of the measurement/analysis unit 10. The measurement/analysis unit 10 determines whether or not a command has been received (step S100). When received, the command is executed (step S101).

Examples of executing a command are listed below.
(1) A memory use amount measurement start/stop command can turn on/off the memory use amount measurement flag 101.
(2) A thread measurement start/terminate command can turn on/off the thread measurement flag 102.
(3) A threshold set/change command can set/change a corresponding threshold (103 to 110).
(4) A forcible garbage collect command calls the garbage collection process of the Java virtual machine 1.

Then, a description will be given below that an analysis result is fed back to the operation environment of an application.

As an analysis result of the measurement/analysis unit 10 of the Java virtual machine 1, a warning of the danger of the memory shortage error, a warning of degraded performance due to the memory shortage, and a notification of a memory size required for recovery is transmitted to the Java virtual machine control unit 20. At this time, assuming that the Java virtual machine 1 and the Java virtual machine control unit 20 are directly coupled in an inter-process communication, the notification is immediately delivered to the application server 2. The Java virtual machine control unit 20 periodically confirms whether or not a notification has been received. Upon receipt of a notification, it immediately passes the notification to the Java virtual machine optimum control unit 21, thereby feeding it back to the operation environment of an application.

For example, upon receipt of a notification of a warning of the danger of the memory shortage error from the Java virtual machine 1, the Java virtual machine optimum control unit 21 stops allocating the application process to the Java virtual machine 1. When the Java virtual machine 1 terminates the application being processed, a substitute Java virtual machine 1' is activated. When a substitute Java virtual machine 1' is to be activated, the optimum memory size is specified in an option presented at the activation of the substitute Java virtual machine 1' based on the memory size required for recovery notified by the Java virtual machine 1.

Upon receipt of a notification of a warning of degraded performance due to the memory shortage from the Java virtual machine 1, the Java virtual machine optimum control unit 21 specifies the optimum memory size in an option presented at the activation of the Java virtual machine 1 based on the notified memory size required for recovery on a next activation of Java virtual machine. There is another feedback method of reducing the allocation of an application process to the Java virtual machine 1 which issued the warning of degraded performance due to the memory shortage.

A notification of a warning of the danger of a deadlock of a thread is not fed back to the activation of the Java virtual machine 1 or the control of the allocation of an application process. The information is left in a file as the log information about the application server 2, and is used in later reconsidering an application.

FIG. 23 is a flowchart of the Java virtual machine optimum control process.

First, a warning and a memory size required for recovery are received (step S110), and the type of a warning is judged (step S111).

In step S111, when it is a warning of the danger of the memory shortage error (warning w1), the Java virtual machine 1 for which the warning has been issued is terminated after the termination of the application (step S112). A substitute Java virtual machine 1' is activated (step S113), and the process terminates. When the substitute Java virtual machine 1' is activated, the optimum memory size is specified in an option based on the received memory size required for recovery.

When it is a warning of the degraded performance of the memory shortage (warning w2) in step S111, then a received memory size required for recovery is stored (step S114), thereby terminating the process. When the Java virtual machine 1 is activated next time, the optimum memory size is specified in an option based on the stored memory size required for recovery.

When it is a warning of the danger of a deadlock (warning w7) in step S111, then a warning of the danger of a deadlock is recorded in a log (step S1115). An operation administrating person is notified of it (step S116), thereby terminating the process.

The effect of the present system is described below. In the present system, all memory allocation and release are not measured, but an algorithm of making a determination based on a measurement when the garbage collection event occurs and based on a periodic measurement of a memory use amount as necessary is used. Therefore, a warning of the danger of the memory shortage error and a warning of the degraded performance of the memory shortage can be issued without a load on an operation environment of an application.

In a method of collecting managed data and analyzing data by an external process, it takes a long time from the measurement of data to the feedback for recovery of data, thereby possibly losing timeliness. Since the present system has means for measuring and analyzing data in a Java virtual machine running an application, more timely feedback can be performed.

Furthermore, since the present system has improvement algorithms for determining the danger depending on various garbage collection adopted by each Java virtual machine at multiple stages, the danger can be more correctly determined.

Although there is a repeated danger only with a warning of the danger of the memory shortage error or a warning of the degraded performance of the memory shortage, the present system issues a notification depending on the memory capacity required for the optimum operation of a Java virtual machine. Therefore, an appropriate feedback can be performed for recovery.

Furthermore, the present system measures and analyzes data of a Java virtual machine, the means for issuing a notification of the danger and the means for controlling a Java virtual machine in an upper layer (application server) are directly coupled in an inter-process communication, and a notification of a warning and feedback can be automatically performed without interference of any person, thereby suppressing the danger of delaying the timing from the occurrence of a problem to the recovery.

The present invention monitors the status of an execution environment of an intermediate layer arranged on a server side in the operation of an application in the three-layer system of a client layer, an intermediate layer, and a database layer configuring an enterprise application, and avoids the dangerous status of the execution environment, thereby operating the application with stability. An execution environment in the intermediate layer arranged on the server can be, for example, an executing system such as a Java virtual machine having the function of managing memory by the garbage collection.

Since the present invention can make means for issuing a warning of the danger by measuring/analyzing data of a Java virtual machine, etc. cooperate with means for controlling a Java virtual machine in an upper layer (application server), and automatically issue a warning and performs feedback without interference of a person, the danger of the memory shortage in an execution environment can be efficiently avoided.

What is claimed is:

1. A method for predicting and avoiding a danger in an execution environment on an application program in a computer system in which a memory area assigned to an application program is released by a garbage collection, the method comprising:
   measuring, when a garbage collection occurs, amount of memory area assigned and not released immediately after the garbage collection;
   predicting a danger of a memory shortage based on the measured amount of memory area assigned and not released;
   notifying an application program of a warning of the predicted danger of the memory shortage;
   extracting a thread on standby or a thread in a wait state for release of a lock by periodically measuring a status of each thread;
   counting times of continuous extraction for the extracted thread; and
   determining, when a number of times continuously extracted exceeds a predetermined threshold in two or more threads, a danger of a deadlock, and outputting a warning.

2. The method for predicting and avoiding a danger in an execution environment according to claim 1, further comprising:
   calculating memory capacity required to avoid the predicted danger of the memory shortage.

3. The method for predicting and avoiding a danger in an execution environment according to claim 2, wherein the notifying step includes notifying the application program of the memory capacity required to avoid the danger of the memory shortage.

4. The method for predicting and avoiding a danger in an execution environment according to claim 3, wherein the memory capacity required to avoid the danger is calculated using an algorithm corresponding to a type of the garbage collection used by the computer system.

5. The method for predicting and avoiding a danger in an execution environment according to claim 1, wherein the danger of the memory shortage is predicted using an algorithm corresponding to a type of the garbage collection used by the computer system.

6. The method for predicting and avoiding a danger in an execution environment according to claim 1,
   wherein the predicting step includes determining, when a ratio of the measured amount of memory area assigned and not released to a total memory capacity of a memory exceeds a predetermined threshold, a danger of a memory shortage error, and
   wherein the notifying steps includes notifying the application program of a warning of the danger of the memory shortage error.

7. The method for predicting and avoiding a danger in an execution environment according to claim 1,
   wherein the predicting step includes determining, when a ratio of the measured amount of memory area assigned and not released to a total memory capacity of a memory tends to continuously increase and continuously exceeds a predetermined threshold, a danger of a memory shortage error, and
   wherein the notifying steps includes notifying the application program of a warning of the danger of the memory shortage error.

8. The method for predicting and avoiding a danger in an execution environment according to claim 1, wherein:
   the garbage collection is a generation type garbage collection;
   the measuring step includes measuring, when the garbage collection occurs on an entire memory, amount of memory area assigned and not released immediately after the garbage collection and an occurrence interval of the garbage collection;
   the determining step includes determining, when the measured occurrence interval runs below a predetermined threshold, a shortage of a memory capacity assigned to a new generation; and
   the notifying step includes notifying the application program of a warning of the shortage the memory capacity assigned to the new generation.

* * * * *

UNITED STATES PATENT AND TRADEMARK OFFICE
CERTIFICATE OF CORRECTION

PATENT NO. : 7,516,292 B2  
APPLICATION NO. : 11/170217  
DATED : April 7, 2009  
INVENTOR(S) : Kimura et al.

Page 1 of 1

It is certified that error appears in the above-identified patent and that said Letters Patent is hereby corrected as shown below:

In the Claims:

Col. 23, Line 36  
Claim 1

Please insert --an-- between "occurs," and "amount".

Col. 24, Line 33  
Claim 7

Please delete "exceeds" and insert --exceed-- in its place.

Col. 24, Line 44  
Claim 8

Please insert --the-- between "memory," and "amount".

Col. 24, Line 49  
Claim 8

Please delete "below a" and insert --below the-- in its place.

Signed and Sealed this  
Twenty-second Day of September, 2015

Michelle K. Lee  
*Director of the United States Patent and Trademark Office*